United States Patent
Sasaki et al.

(10) Patent No.: US 11,075,555 B2
(45) Date of Patent: Jul. 27, 2021

(54) AXIAL GAP MOTOR AND METHOD FOR MANUFACTURING ROTOR

(71) Applicant: MITSUBISHI HEAVY INDUSTRIES, LTD., Tokyo (JP)

(72) Inventors: Mikito Sasaki, Tokyo (JP); Masahiro Nil, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 483 days.

(21) Appl. No.: 16/050,600

(22) Filed: Jul. 31, 2018

(65) Prior Publication Data

US 2019/0044401 A1    Feb. 7, 2019

(30) Foreign Application Priority Data

Aug. 7, 2017   (JP) .............................. JP2017-152472

(51) Int. Cl.
| | |
|---|---|
| *H02K 1/27* | (2006.01) |
| *H02K 16/04* | (2006.01) |
| *H02K 1/18* | (2006.01) |
| *H02K 21/24* | (2006.01) |

(52) U.S. Cl.
CPC ........... *H02K 1/2793* (2013.01); *H02K 1/182* (2013.01); *H02K 16/04* (2013.01); *H02K 21/24* (2013.01); *H02K 2213/03* (2013.01)

(58) Field of Classification Search
CPC ......... H02K 1/27; H02K 11/048; H02K 21/04
USPC .................................. 310/156.43, 267, 268
See application file for complete search history.

(56) References Cited

U.S. PATENT DOCUMENTS

| | | | |
|---|---|---|---|
| 6,373,162 B1 * | 4/2002 | Liang ................... | H02K 1/2793 310/112 |
| 8,049,389 B2 | 11/2011 | Abe et al. | |
| 2009/0295246 A1 * | 12/2009 | Abe ...................... | H02K 1/2793 310/156.35 |
| 2010/0052437 A1 | 3/2010 | Froeschle et al. | |
| 2016/0322869 A1 | 11/2016 | Takezaki et al. | |

FOREIGN PATENT DOCUMENTS

| | | | |
|---|---|---|---|
| CN | 102138273 A | | 7/2011 |
| CN | 104201848 A | | 12/2014 |
| CN | 106233578 A | | 12/2016 |
| CN | 106374701 A | | 2/2017 |
| JP | 2006-222131 A | | 8/2006 |
| JP | 2006222131 A | * | 8/2006 |
| JP | 2007336703 A | * | 12/2007 |
| JP | 2010-098929 A | | 4/2010 |

* cited by examiner

*Primary Examiner* — Jose A Gonzalez Quinones
(74) *Attorney, Agent, or Firm* — Manabu Kanesaka; Benjamin Hauptman; Kenneth Berner

(57) ABSTRACT

An axial gap motor includes: a first stator and a second stator disposed to be opposite to each other in an axial direction; and a rotor including a first magnet layer in which a plurality of first main magnetic pole magnets and a plurality of first auxiliary pole magnets are arranged in a Halbach array in a circumferential direction to increase a magnetic field strength toward the first stator and a second magnet layer in which a plurality of second main magnetic pole magnets and a plurality of second auxiliary pole magnets are arranged in a Halbach array in the circumferential direction to increase a magnetic field strength toward the second stator between the first stator and the second stator.

20 Claims, 12 Drawing Sheets

AXIAL GAP MOTOR AND METHOD FOR MANUFACTURING ROTOR

CROSS-REFERENCE TO RELATED APPLICATION

Priority is claimed on Japanese Patent Application No. 2017-152472, filed Aug. 7, 2017, the content of which is incorporated herein by reference.

BACKGROUND OF THE INVENTION

Field of the Invention

The present invention relates to an axial gap motor and a method for manufacturing a rotor.

Description of Related Art

An axial gap motor in which magnets are arranged in a Halbach array is one type of axial gap motor.

For example. Patent Document 1 describes an axial gap motor in which a rotor having magnets arranged in a Halbach array is provided between stators disposed to be opposite to each other in an axial direction.

PATENT DOCUMENT

[Patent Document 1] Japanese Unexamined Patent Application, First Publication No. 2010-98929

SUMMARY OF THE INVENTION

In the axial gap motor in Patent Document 1, a plurality of magnets are disposed around a plurality of comb teeth portions in a rotor plate. However, since the axial gap motor in Patent Document 1 has a structure in which the plurality of magnets are arranged around the comb teeth portions, neighboring magnets repel each other or attract each other during an assembly task. For this reason, the axial gap motor in Patent Document 1 has a structure which is difficult to assemble.

The present invention provides an axial gap motor which is easy to assemble, and a method for manufacturing a rotor.

An axial gap motor according to a first aspect includes: a first stator and a second stator disposed to be opposite to each other in an axial direction; and a rotor including a first magnet layer in which a plurality of first main magnetic pole magnets and a plurality of first auxiliary pole magnets are arranged in a Halbach array in a circumferential direction to increase a magnetic field strength toward the first stator and a second magnet layer in which a plurality of second main magnetic pole magnets and a plurality of second auxiliary pole magnets are arranged in a Halbach array in the circumferential direction to increase a magnetic field strength toward the second stator between the first stator and the second stator.

An axial gap motor according to a second aspect is the axial gap motor according to the first aspect wherein the first magnet layer includes a first front surface and a first back surface and a magnetic field strength on the first front surface side is higher than that on the first back surface side, the second magnet layer includes a second front surface and a second back surface and a magnetic field strength on the second front surface side is higher than that on the second back surface side, and the first magnet layer and the second magnet layer are disposed such that the first back surface and the second back surface are opposite to each other.

An axial gap motor according to a third aspect is the axial gap motor according to the first or second aspect wherein the orientation of a magnetic pole of the first main magnetic pole magnets and the orientation of a magnetic pole of the second main magnetic pole magnets are aligned.

An axial gap motor according to a fourth aspect is the axial gap motor according to any one of the first to third aspects wherein the rotor includes a fastening mechanism configured to fasten the first magnet layer and the second magnet layer.

An axial gap motor according to a fifth aspect is the axial gap motor according to the fourth aspect wherein the rotor further includes a positioning mechanism configured to position the first magnet layer and the second magnet layer in the circumferential direction with respect to the fastening mechanism.

An axial gap motor according to a sixth aspect is the axial gap motor according to any one of the first to fifth aspects wherein three of the first auxiliary pole magnets are disposed in each space between the plurality of first main magnetic pole magnets and three of the second auxiliary pole magnets are disposed in each space between the plurality of second main magnetic pole magnets, when one first main magnetic pole magnet and three first auxiliary pole magnets adjacent to each other in the circumferential direction are set as a first magnet group and a width of the first magnet group in the circumferential direction is set to 4, a width of the first main magnetic pole magnet in the circumferential direction is 2.5 to 3.0, and when one second main magnetic pole magnet and three second auxiliary pole magnets adjacent to each other in the circumferential direction are set as a second magnet group and a width of the second magnet group in the circumferential direction is set to 4, a width of the second main magnetic pole magnet in the circumferential direction is 2.5 to 3.0.

An axial gap motor according to a seventh aspect is the axial gap motor according to any one of the first to fifth aspects wherein two of the first auxiliary pole magnets are disposed in each space between the plurality of first main magnetic pole magnets and two of the second auxiliary pole magnets are disposed in each space between the plurality of second main magnetic pole magnets, when one first main magnetic pole magnet and two first auxiliary pole magnets adjacent to each other in the circumferential direction are set as a first magnet group and a width of the first magnet group in the circumferential direction is set to 3, a width of the first main magnetic pole magnet in the circumferential direction is 1.6 to 2.2, and when one second main magnetic pole magnet and two second auxiliary pole magnets adjacent to each other in the circumferential direction are set as a second magnet group and a width of the second magnet group in the circumferential direction is set to 3, a width of the second main magnetic pole magnet in the circumferential direction is 1.6 to 2.2.

An axial gap motor according to an eighth aspect is the axial gap motor according to any one of the first to fifth aspects wherein one of the first auxiliary pole magnets is disposed in each space between the plurality of first main magnetic pole magnets and one of the second auxiliary pole magnets is disposed in each space between the plurality of second main magnetic pole magnets, when one first main magnetic pole magnet and one first auxiliary pole magnet adjacent to each other in the circumferential direction are set as a first magnet group and a width of the first magnet group in the circumferential direction is set to 2, a width of the first main magnetic pole magnet in the circumferential direction is 1.2 to 1.6, and when one second main magnetic pole magnet and one second auxiliary pole magnet adjacent to each other are set as a second magnet group and a width of the second magnet group in the circumferential direction is set to 3, a width of the second main magnetic pole magnet in the circumferential direction is 1.2 to 1.6.

In addition, a method for manufacturing a rotor of an axial gap motor according to a ninth aspect includes: a fastening mechanism disposition step of disposing a first end plate and a first rotor structural member; a first magnet layer-forming step of arranging a plurality of first main magnetic pole magnets and a plurality of first auxiliary pole magnets in a Halbach array and forming a first magnet layer to increase a magnetic field strength on a surface side facing the first end plate; a second magnet layer-forming step of arranging a plurality of second main magnetic pole magnets and a plurality of second auxiliary pole magnets in a Halbach array and forming a second magnet layer to increase a magnetic field strength on a surface side opposite to the surface facing the first magnet layer; and a fastening step of disposing a second end plate and fastening the first magnet layer and the second magnet layer.

According to one of the above-described aspects, the axial gap motor is easy to assemble.

DETAILED DESCRIPTION OF THE INVENTION

Various embodiments of the present invention will be described below with reference to the drawings.

First Embodiment

An axial gap motor 1 according to a first embodiment will be described in detail below with reference to FIGS. 1 to 13.

Figure 1:
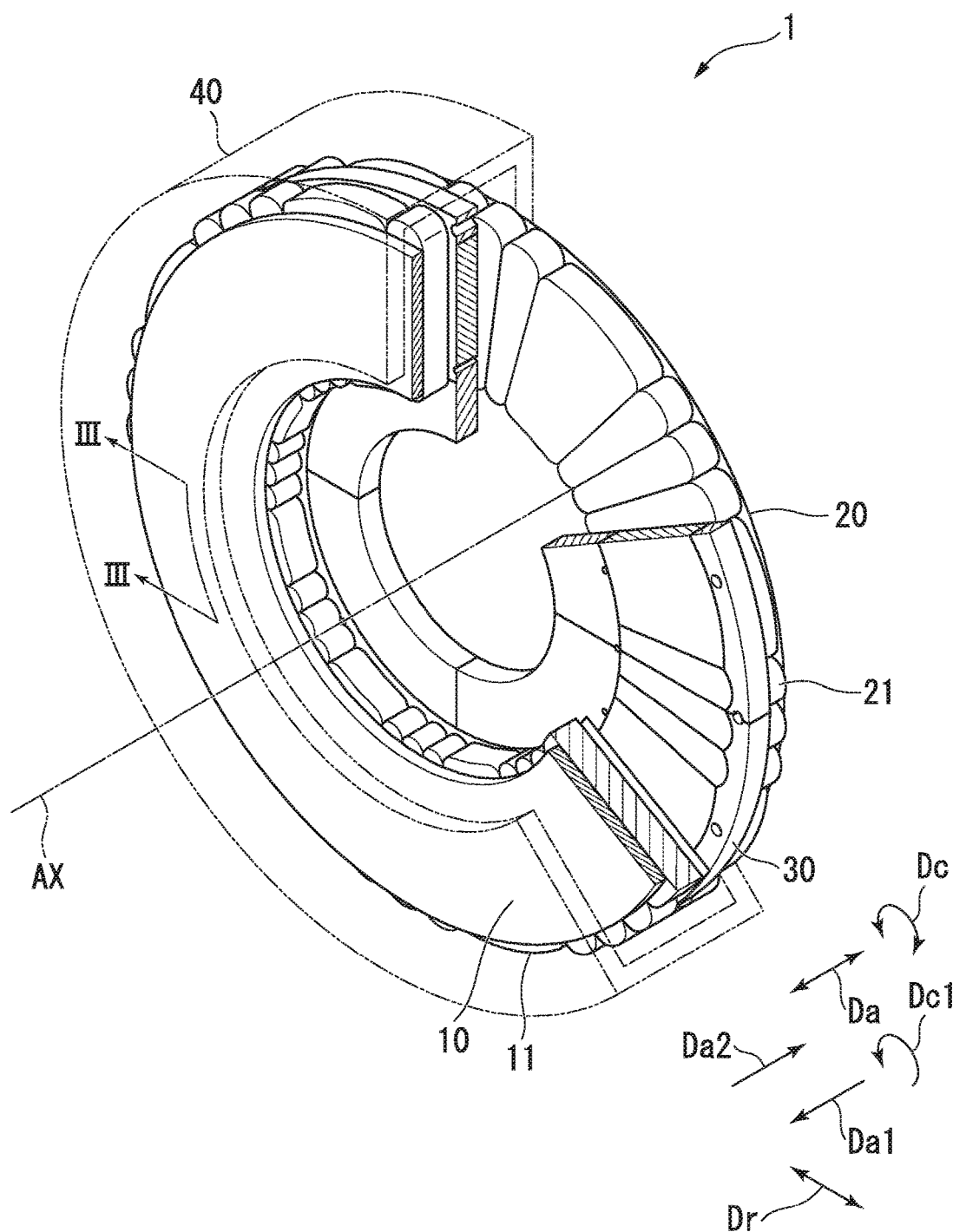
FIG. 1 is a perspective view of an axial gap motor according to a first embodiment of the present invention.

As illustrated in FIG. 1, the axial gap motor 1 includes a first stator 10, a second stator 20, a rotor 30, and a frame 40. The first stator 10, the second stator 20, and the rotor 30 have ring shapes.

In this embodiment, the first stator 10, the second stator 20, and the rotor 30 have substantially annular shapes. Furthermore, the first stator 10, the second stator 20, and the rotor 30 are arranged coaxially such that the central axes of the rings thereof coincide with an axis AX.

In the axial gap motor 1, it is possible to rotate the rotor 30 with respect to the first stator 10 and the second stator 20 using the axis AX as a rotational axis. Thus, in the axial gap motor 1, it is possible to rotate, for example, a shaft or a gear connected to the rotor 30.

In the following description, unless particularly noted otherwise, a direction in which the axis AX extends is referred to as "an axial direction Da" and a circumferential direction of the rotor 30 is referred to as "a circumferential direction Dc." Furthermore, a direction in the axial direction Da from the second stator 20 toward the first stator 10 is referred to as "an upward direction Da1."

Also, a clockwise direction when the upward direction Da1 is viewed is referred to as "a first circumferential direction Dc1."

A direction in the axial direction Da from the first stator 10 toward the second stator 20 is referred to as "a downward direction Da2."

A radial direction of the rotor 30 is referred to as "a radial direction Dr."

The first stator 10 and the second stator 20 are disposed to be opposite to each other in the axial direction Da to sandwich the rotor 30 therebetween. In this embodiment, the first stator 10 and the second stator 20 are accommodated in and fixed to the frame 40.

The first stator 10 has a plurality of stator windings 11. The second stator 20 has a plurality of stator windings 21. Each of the stator windings 11 and the stator windings 21 generates a rotating magnetic field which rotates the rotor 30. Each of the stator windings 11 and the stator windings 21 is formed of an electric wire covered with an insulator.

(Rotor)

The rotor 30 is provided to be rotatable about the axis AX with respect to the first stator 10 and the second stator 20. In this embodiment, the rotor 30 is provided to be rotatable in the frame 40.

Figure 2:
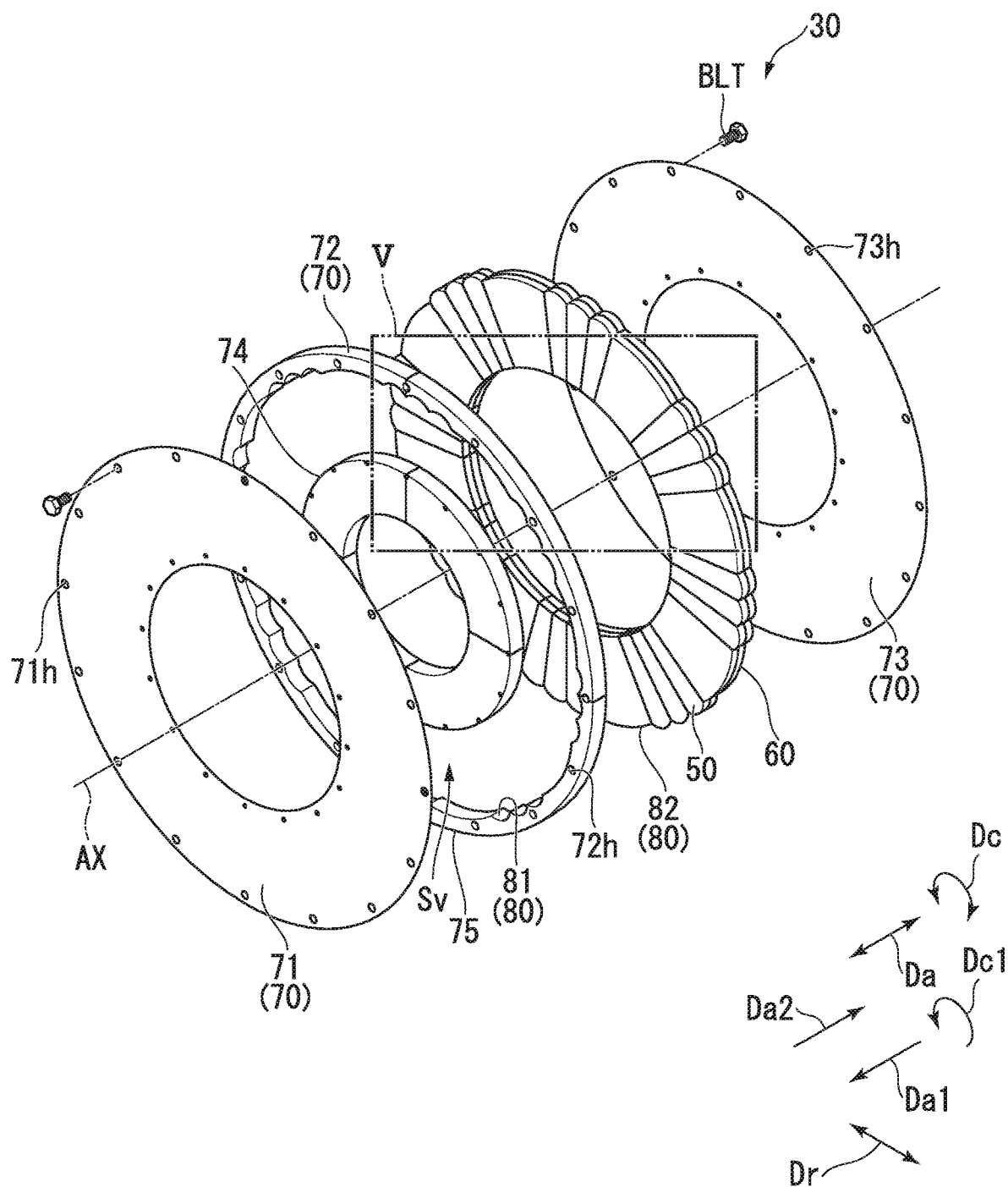
FIG. 2 is an exploded perspective view of a rotor according to the first embodiment of the present invention.

As illustrated in FIG. 2, the rotor 30 includes a first magnet layer 50, a second magnet layer 60, a fastening mechanism 70, and a positioning mechanism 80.

(First Magnet Layer)

Figure 3:
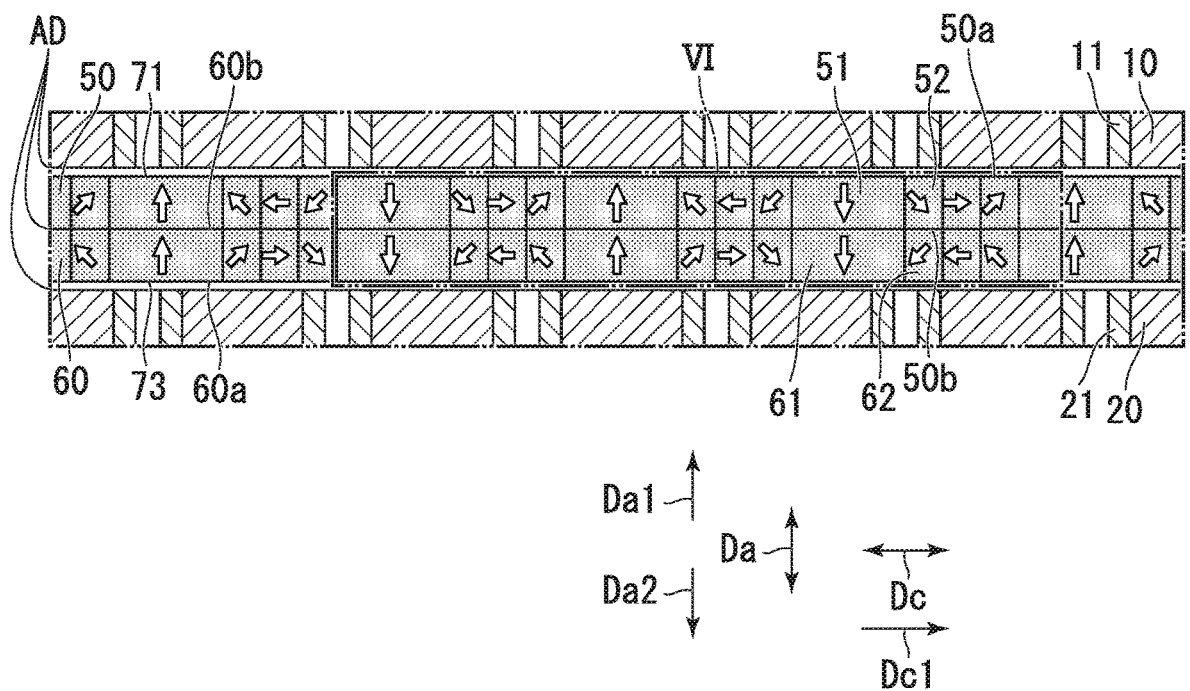
FIG. 3 is a cross-sectional view taken along line III-III in FIG. 1.

As illustrated in FIG. 3, the first magnet layer 50 includes a plurality of first main magnetic pole magnets 51 (main magnetic poles) and a plurality of first auxiliary pole magnets 52 (auxiliary poles). The first magnet layer 50 has a first front surface 50a on the upward direction Da1 side and a first back surface 50b opposite the first front surface 50a.

Each of the first main magnetic pole magnets 51 and the first auxiliary pole magnets 52 is a magnet and may be any magnet such as a ferrite magnet or a rare earth magnet.

The plurality of first main magnetic pole magnets 51 are arranged at intervals in the circumferential direction Dc. The plurality of first main magnetic pole magnets 51 are arranged such that the magnetic poles are oriented in the axial direction Da so that the orientations of the magnetic poles are opposite due to the first main magnetic pole magnets 51 being adjacent to each other in the circumferential direction Dc.

In this embodiment, three first auxiliary pole magnets 52 are disposed between the first main magnetic pole magnets 51 adjacent to each other in the circumferential direction Dc. In other words, one first main magnetic pole magnet 51 and three first auxiliary pole magnets 52 are alternately arranged in the circumferential direction Dc.

The first main magnetic pole magnets 51 and the first auxiliary pole magnets 52 are arranged in a Halbach array. In other words, as illustrated in FIG. 3, the first main magnetic pole magnets 51 and the first auxiliary pole magnets 52 are disposed such that the orientations of the magnetic poles sequentially rotate in the first circumferential direction Dc1 in a plane in the circumferential direction Dc. In this embodiment, the first main magnetic pole magnets 51 and the first auxiliary pole magnets 52 are disposed such that the magnetic poles sequentially rotate by 45°. In addition, the first main magnetic pole magnets 51 and the first auxiliary pole magnets 52 are disposed such that the orientations of the magnetic poles sequentially rotate counterclockwise in the first circumferential direction Dc1 when the inside is viewed from the outside in the radial direction Dr (when viewed from a position perpendicular to the paper surface of FIG. 3).

Figure 4:
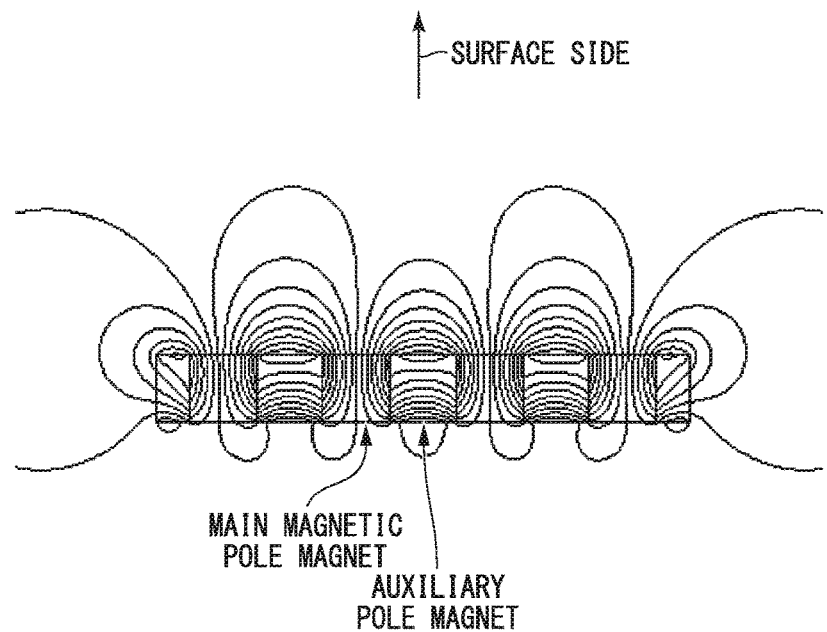
FIG. 4 is a diagram explaining a magnetic flux distribution in a Halbach array.

Generally, as illustrated in FIG. 4, a plurality of main magnetic pole magnets and a plurality of auxiliary pole magnets arranged in a Halbach array strengthen a magnetic field strength formed near a front surface of a magnet layer among magnetic field strengths formed near the front surface and a back surface.

The plurality of first main magnetic pole magnets 51 and the plurality of first auxiliary pole magnets 52 disposed as in this embodiment are arranged in a Halbach array to increase the magnetic field strength toward the first stator 10.

(Second Magnet Layer)

The second magnet layer 60 includes a plurality of second main magnetic pole magnets 61 (main magnetic poles) and a plurality of second auxiliary pole magnets 62 (auxiliary poles). The second magnet layer 60 has a second front surface 60a on the downward direction Da2 side and a second back surface 60b opposite the second front surface 60a.

Each of the second main magnetic pole magnets 61 and the second auxiliary pole magnets 62 is a magnet and may be any magnet such as a ferrite magnet or a rare earth magnet.

The plurality of second main magnetic pole magnets 61 are arranged at intervals in the circumferential direction Dc. The plurality of second main magnetic pole magnets 61 are arranged such that the magnetic poles are oriented toward the axial direction Da so that the orientations of the magnetic poles are opposite due to the second main magnetic pole magnets 61 being adjacent to each other in the circumferential direction Dc.

In this embodiment, three second auxiliary pole magnets 62 are disposed between the second main magnetic pole magnets 61 adjacent to each other in the circumferential direction Dc. In other words, one second main magnetic pole magnet 61 and three second auxiliary pole magnets 62 are alternately arranged in the circumferential direction Dc.

The second main magnetic pole magnets 61 and the second auxiliary pole magnets 62 are arranged in a Halbach array. In other words, the second main magnetic pole magnets 61 and the second auxiliary pole magnets 62 are disposed such that the orientations of the magnetic poles sequentially rotate in the first circumferential direction Dc1 in a plane in the circumferential direction Dc. In this embodiment, the second main magnetic pole magnets 61 and the second auxiliary pole magnets 62 are disposed such that the magnetic poles sequentially rotate by 45°. In addition, the second main magnetic pole magnets 61 and the second auxiliary pole magnets 62 are disposed such that the orientations of the magnetic poles sequentially rotate counterclockwise in the first circumferential direction Dc1 when the inside is viewed from the outside in the radial direction Dr (when viewed from a position perpendicular to the paper surface of FIG. 3).

The plurality of second main magnetic pole magnets 61 and the plurality of second auxiliary pole magnets 62 disposed as in this embodiment are arranged in a Halbach array to increase the magnetic field strength toward the second stator 20.

The second magnet layer 60 is disposed with respect to the first magnet layer 50 such that the first back surface 50b and the second back surface 60b are opposite to each other.

Each of the first main magnetic pole magnets 51 is paired with one of the second main magnetic pole magnets 61 arranged in the axial direction Da. In each pair, a position of the first main magnetic pole magnet 51 in the circumferential direction Dc and a position of the second main magnetic pole magnet 61 in the circumferential direction Dc are aligned.

Likewise, each of the first auxiliary pole magnets 52 is paired with one of the second auxiliary pole magnets 62 arranged in the axial direction Da. In each pair, a position of the first auxiliary pole magnet 52 in the circumferential direction Dc and a position of the second auxiliary pole magnet 62 in the circumferential direction Dc are aligned.

In addition, as illustrated in FIG. 3, the second magnet layer 60 is disposed with respect to the first magnet layer 50 such that the orientations of the magnetic poles of the first main magnetic pole magnets 51 and the orientations of the magnetic poles of the second main magnetic pole magnets 61 are aligned with each other.

(Fastening Mechanism)

Referring again to FIG. 2, the fastening mechanism 70 includes a first end plate 71, a rotor structural member 72, and a second end plate 73. The fastening mechanism 70 is disposed such that the first end plate 71 faces the first stator 10 and the second end plate 73 faces the second stator 20.

The fastening mechanism 70 fastens the first magnet layer 50 and the second magnet layer 60 such that the first front surface 50a of the first magnet layer 50 faces the first end plate 71 and the second front surface 60a of the second magnet layer 60 faces the second end plate 73.

The first end plate 71, the rotor structural member 72, and the second end plate 73 may be made of any material that does not easily affect the magnetic fluxes of the first magnet layer 50 and the second magnet layer 60. In this embodiment, the first end plate 71, the rotor structural member 72, and the second end plate 73 are formed of aluminum, stainless steel, or the like.

Each of the first end plate 71 and the second end plate 73 has a ring shape. In Each of the first end plate 71 and the second end plate 73 has a ring shape. In this embodiment, each of the first end plate 71 and the second end plate 73 has a substantially annular shape.

Each first end plate 71 has a plurality of holes 71h passing through its plate surface. A plurality of the holes 71h are provided to be arranged along an outer circumference of the plate surface of the first end plate 71 and a plurality of the holes 71h are provided to be arranged along an inner circumference of the plate surface.

Each second end plate 73 has a plurality of holes 73h passing through its plate surface. A plurality of the holes 73h are provided to be arranged along an outer circumference of the plate surface of the second end plate 73 and a plurality of the holes 73h are provided to be arranged along an inner circumference of the plate surface.

The rotor structural member 72 has a plurality of bolt holes 72h. The bolt holes 72h are provided in both surfaces of the rotor structural member 72 facing in the axial direction Da. The bolt holes 72h are provided in accordance with the positions of the holes 71h and the holes 73h toward the holes 71h and the holes 73h.

In this embodiment, each of the bolt holes 72h is a screw hole. For this reason, bolts BLT inserted into the holes 71h and the holes 73h are screwed in the bolt holes 72h. Thus, the rotor structural member 72 is fixed to the first end plate 71 and the second end plate 73.

The rotor structural member 72 includes a ring-shaped inner ring member 74 and a ring-shaped outer ring member 75.

In this embodiment, the inner ring member 74 and the outer ring member 75 have substantially annular shapes. Furthermore, in this embodiment, the inner ring member 74 and the outer ring member 75 are each divided into four portions in the circumferential direction Dc. In addition, the inner ring member 74 and the outer ring member 75 are fixed to the first end plate 71 and the second end plate 73 such that the first end plate 71, the second end plate 73, the inner ring member 74, and the outer ring member 75 have a coaxial arrangement in which all of the central axes of the rings coincide with the axis AX.

The first magnet layer 50 and the second magnet layer 60 are accommodated in a space Sv defined between the inner ring member 74 and the outer ring member 75 to overlap each other.

The first end plate 71 and the second end plate 73 are fastened to each other by screwing the bolt BLT via the rotor structural member 72. For this reason, the first end plate 71 and the second end plate 73 fasten the first magnet layer 50 and the second magnet layer 60 in the axial direction Da.

In this embodiment, the first end plate 71 overlaps the rotor structural member 72 in the radial direction Dr. Similarly, the second end plate 73 overlaps the rotor structural member 72 in the radial direction Dr. For this reason, the first end plate 71 and the second end plate 73 fasten the first magnet layer 50 and the second magnet layer 60 by being screwed in portions thereof overlapping the rotor structural member 72.

(Positioning Mechanism)

The positioning mechanism 80 positions the first magnet layer 50 and the second magnet layer 60 in the circumferential direction Dc with respect to the fastening mechanism 70.

Figure 5:
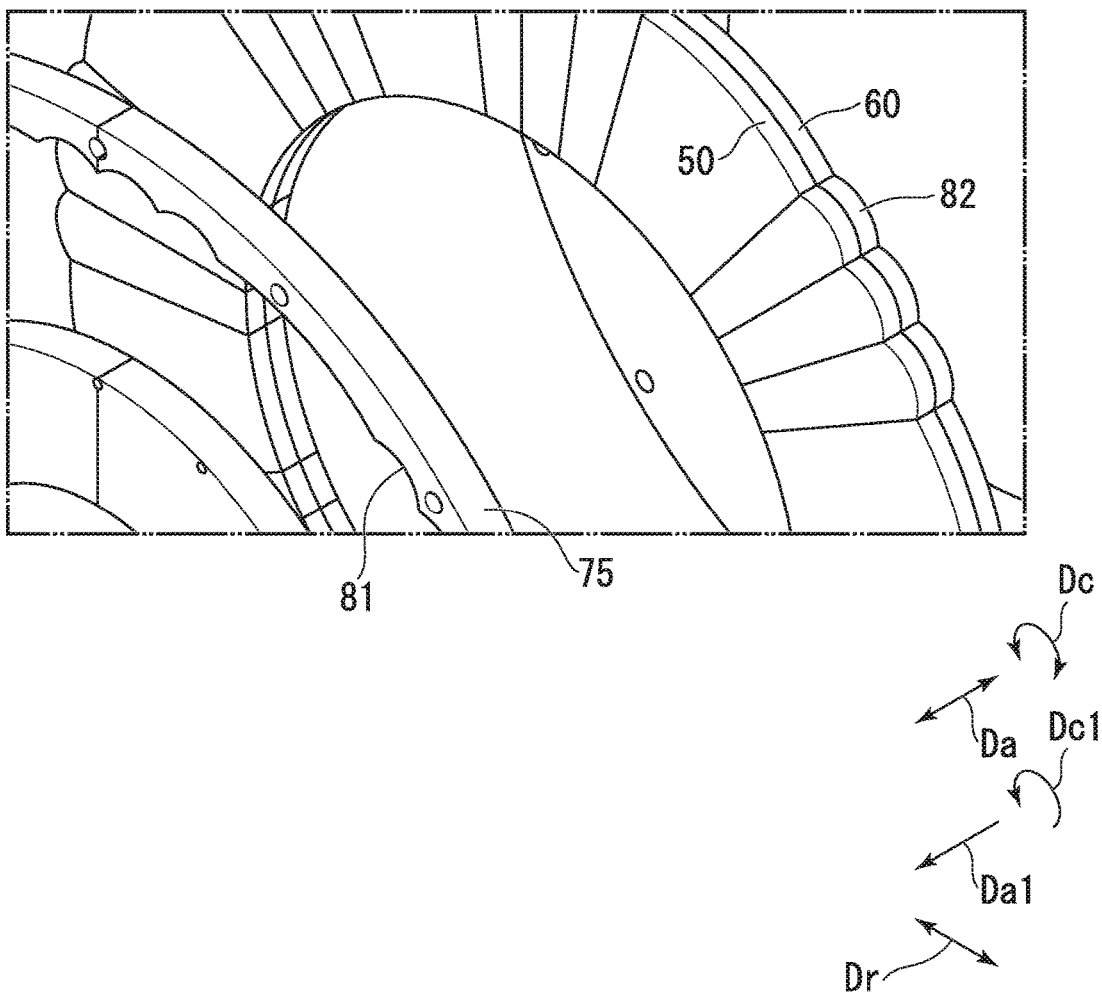
FIG. 5 is an enlarged diagram of a portion V in FIG. 2.

As illustrated in FIG. 5, a plurality of concave portions 81 and a plurality of convex portions 82 are provided as the positioning mechanism 80.

The plurality of concave portions 81 are provided in an inner circumferential surface of the outer ring member 75 to be arranged in the circumferential direction Dc.

In this embodiment, the concave portions 81 are integrally formed with the outer ring member 75. The concave portions 81 are made of a material that does not easily affect the magnetic fluxes formed by the first magnet layer 50 and the second magnet layer 60 as in the outer ring member 75.

For example, the concave portions 81 are formed when an inner circumferential shape of the outer ring member 75 is processed.

The concave portions 81 are provided at positions at which each of the concave portions 81 is opposite to one of the convex portions 82.

Each of the concave portions 81 is recessed in a concave shape toward the outside in the radial direction Dr. In this embodiment, each of the concave portions 81 has a shape obtained by cutting an imaginary inscribed circle of the outer ring member 75 in a circular arc having a radius of curvature smaller than a radius of curvature of the inscribed circle outward in the radial direction Dr in a cross-sectional view in the axial direction Da.

The plurality of convex portions 82 are arranged in the circumferential direction Dc. The convex portions 82 are provided from an outer circumferential surface of the first magnet layer 50 to an outer circumferential surface of the second magnet layer 60 in the axial direction Da.

The convex portions 82 are provided in each pair of the first main magnetic pole magnets 51 and the second main magnetic pole magnets 61 arranged in the axial direction Da and are provided in each pair of the first auxiliary pole magnets 52 and the second auxiliary pole magnets 62 arranged in the axial direction Da.

In this embodiment, the convex portions 82 are integrally formed with the first magnet layer 50 and the second magnet layer 60. The convex portions 82 are made of the same material as the first magnet layer 50 and the second magnet layer 60.

For example, the convex portions 82 are formed when the outer circumferential shapes of the first magnet layer 50 and the second magnet layer 60 are processed.

The convex portions 82 protrude outward in the radial direction Dr. In this embodiment, each of the convex portions 82 has a shape in which the convex portion 82 protrudes in a circular arc shape having a radius of curvature smaller than a radius of curvature of a circumscribed circle outward in the radial direction Dr toward an imaginary circumscribed circle of the outer ring member 75 in a cross-sectional view in the axial direction Da.

Positions at which the convex portions 82 are provided in the circumferential direction Dc coincide with positions at which the concave portions 81 are provided in the circumferential direction Dc. Shapes of the convex portions 82 coincide with shapes of the concave portions 81. For this reason, when each of the convex portions 82 is fitted into one of the concave portions 81, the positions of the first magnet layer 50 and the second magnet layer 60 relative to the outer ring member 75 in the circumferential direction Dc are determined.

(Dimensions of Main Magnetic Pole Magnet and Auxiliary Pole Magnet)

Figure 6:
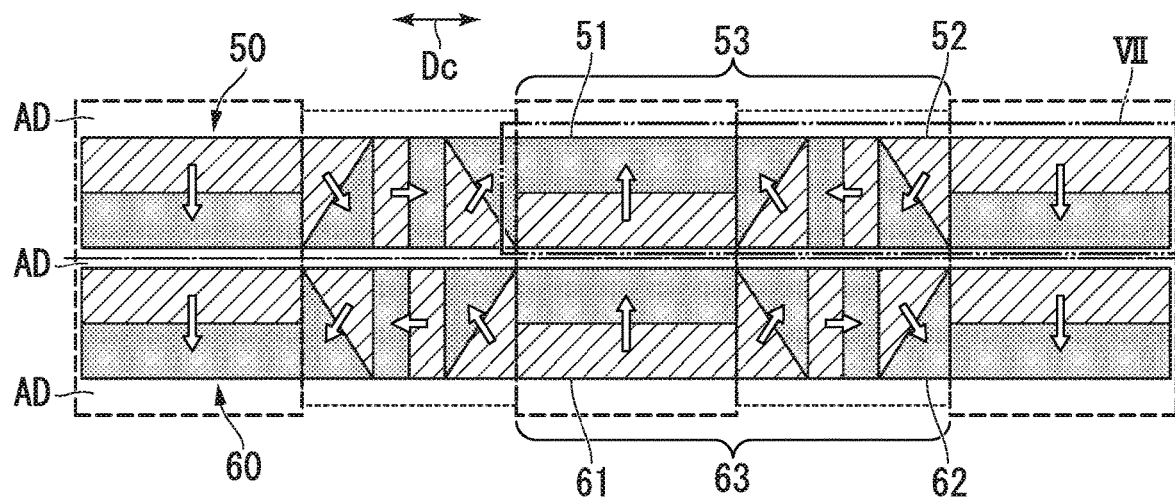
FIG. 6 is an enlarged diagram of a portion VI in FIG. 3.

As illustrated in FIG. 6, one first main magnetic pole magnet 51 and three first auxiliary pole magnets 52 adjacent to each other in the circumferential direction Dc are set as a first magnet group 53 with respect to the first magnet layer 50. Dotted regions illustrated in FIG. 6 correspond to N poles in magnets and hatched regions correspond to S poles in the magnets.

Figure 7:
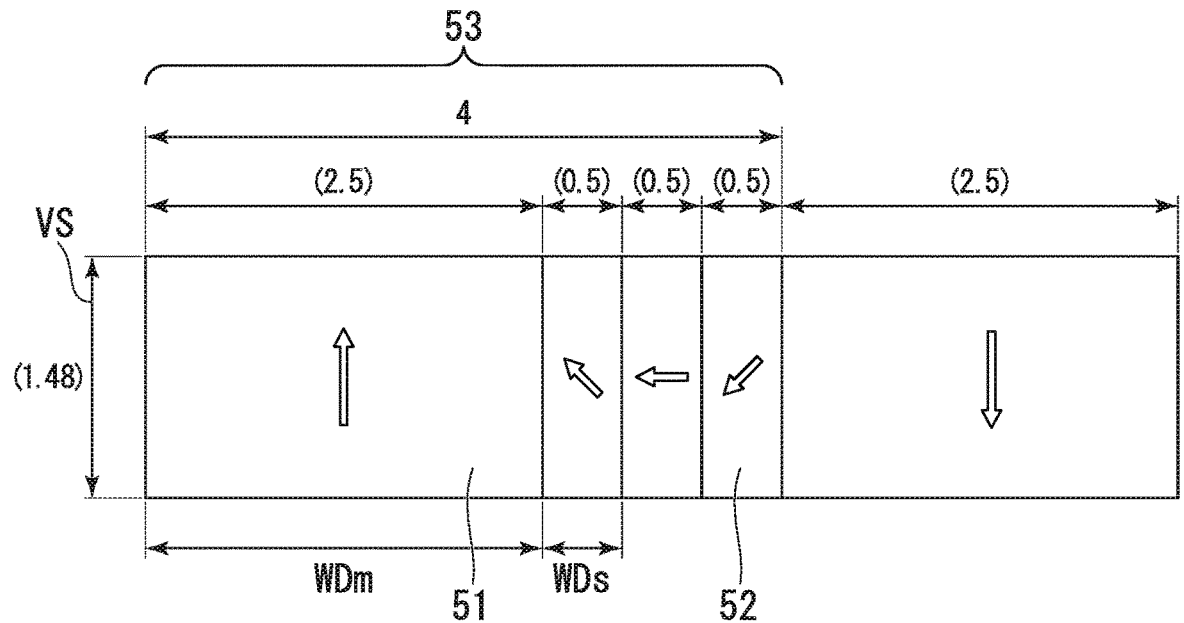
FIG. 7 is a diagram explaining a width of each magnetic pole of the rotor according to the first embodiment of the present invention.

FIG. 7 illustrates a relationship between magnetic poles in a portion VII in FIG. 6 in an enlarged scale. As illustrated in FIG. 7, in this embodiment, when a width of the first magnet group 53 in the circumferential direction Dc is set to 4, a width WDm of the one first main magnetic pole magnet 51 in the circumferential direction Dc in the first magnet group 53 is set to 2.5 and a width WDs of each of the three first auxiliary pole magnets 52 in the circumferential direction Dc in the first magnet group 53 is set to 0.5. Furthermore, although not particularly limited, a length VS of the first magnet group 53 in the axial direction Da is set to 1.48. In other words, a ratio between the width WDm of the first main magnetic pole magnet 51 in the circumferential direction Dc and the width WDs of each of the first auxiliary pole magnets 52 in the circumferential direction Dc is 5:1.

As illustrated in FIG. 6, one second main magnetic pole magnet 61 and three second auxiliary pole magnets 62 adjacent to each other in the circumferential direction Dc are also set as a second magnet group 63 with respect to the second magnet layer 60. Dotted regions illustrated in FIG. 6 correspond to N poles in magnets and hatched regions correspond to S poles in the magnets.

In this embodiment, when a width of the second magnet group 63 in the circumferential direction Dc is set to 4, a width WDm of the one second main magnetic pole magnet 61 in the circumferential direction Dc in the second magnet group 63 is set to 2.5 and a width WDs of each of the three second auxiliary pole magnets 62 in the circumferential direction Dc in the second magnet group 63 is set to 0.5 as in the first magnet layer 50. Furthermore, although not particularly limited, a length VS of the second magnet group 63 in the axial direction Da is set to 1.48.

Figure 8:
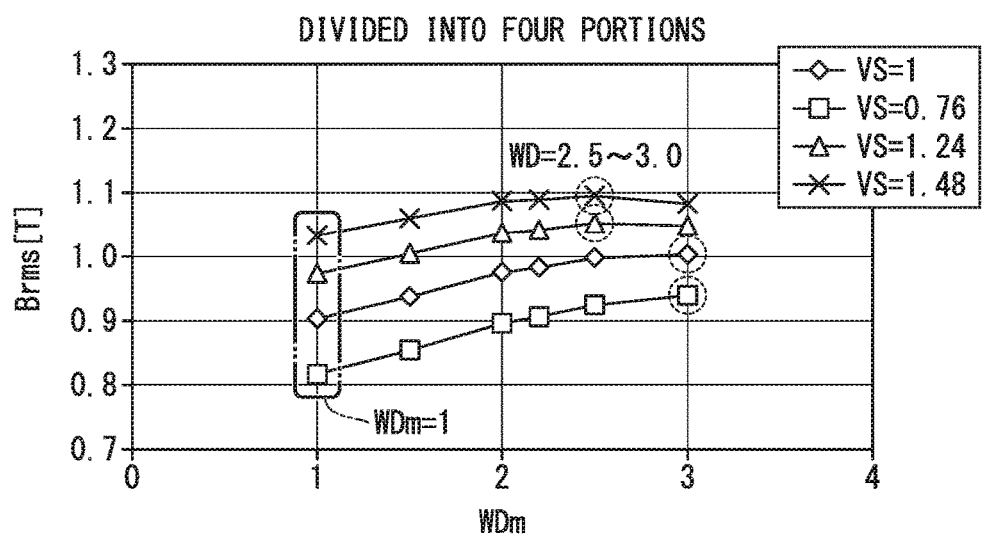
FIG. 8 is a graph describing a relationship between a width of a main magnetic pole of the rotor according to the first embodiment of the present invention and a magnetic flux density effective value.

FIG. 8 is a graph illustrating calculation results of magnetic flux densities when widths of the first magnet group 53 and the second magnet group 63 in the circumferential direction Dc are fixed to 4 and the width WDm (a ratio between the width WDm and the width WDs) is changed. A horizontal axis indicates the width WDm and a vertical axis indicates a magnetic flux density effective value Brms of a motor gap (between the rotor 30 and each of the first stator 10 and the second stator 20). The magnetic flux density effective value of the motor gap is associated with a motor torque. "♦" indicates a case in which a length VS=1. "□" indicates a case in which the length VS=0.76, "△" indicates a case in which the length VS=1.24, and "x" indicates a case in which the length VS=1.48.

As illustrated in FIG. 8, when it is assumed that the width WDm=2.0 to 3.0, it is possible to increase the magnetic flux density effective value Brms of a motor gap. Therefore, the width WDm may be set to 2.0 to 3.0. The width WDm is preferably set to 2.2 to 3.0, and more preferably set to 2.5 to 3.0.

As a first modified example, two auxiliary pole magnets may be disposed between the main magnetic pole magnets adjacent to each other in the circumferential direction Dc.

To be specific, two first auxiliary pole magnets 52 are disposed between the first main magnetic pole magnets 51 adjacent to each other in the circumferential direction Dc with respect to a first magnet layer 50. In other words, one first main magnetic pole magnet 51 and two first auxiliary pole magnets 52 are alternately arranged in the circumferential direction Dc. In this case, the one first main magnetic pole magnet 51 and the two first auxiliary pole magnets 52 are disposed so that the orientations of the magnetic poles sequentially rotate 60° in the first circumferential direction Dc1 in a plane in the circumferential direction Dc.

Figure 9:
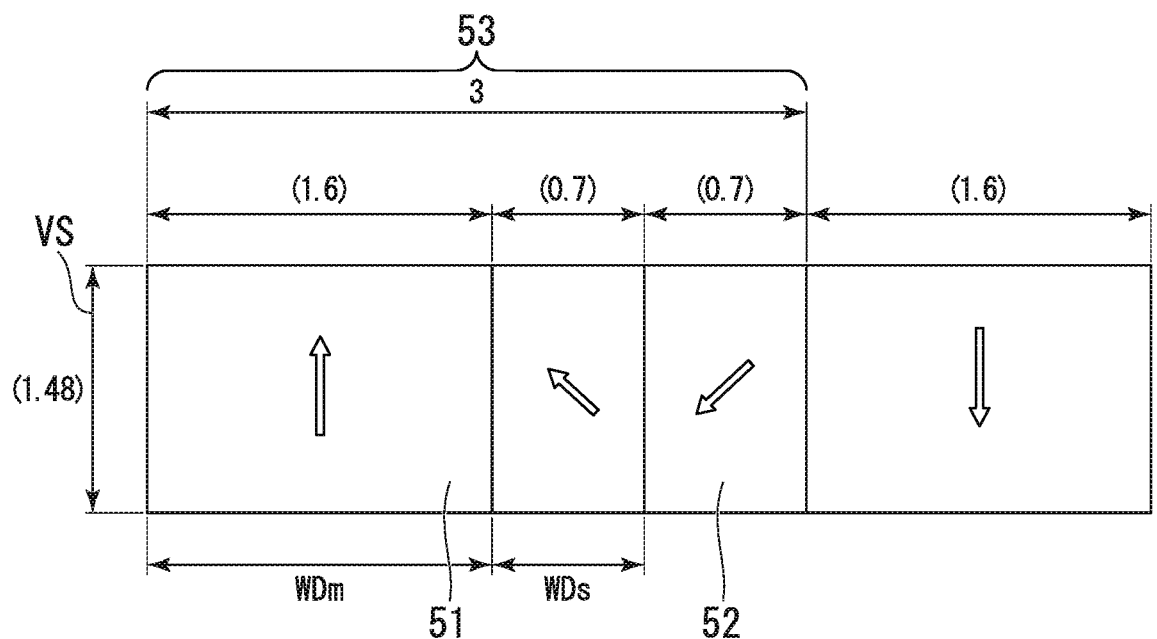
FIG. 9 is a diagram explaining a width of each magnetic pole of a rotor according to a first modified example.

The dimensions of the first main magnetic pole magnet 51 and the first auxiliary pole magnets 52 are set to, for example, the dimensions illustrated in FIG. 9. In FIG. 9, when a width of a first magnet group 53 in the circumferential direction Dc is set to 3, a width WDm of one first main magnetic pole magnet 51 in the circumferential direction Dc in the first magnet group 53 is set to 1.6 and a width WDs of each of the two first auxiliary pole magnets 52 in the circumferential direction Dc in the first magnet group 53 is set to 0.7.

The same applies to a second magnet layer 60.

Figure 10:
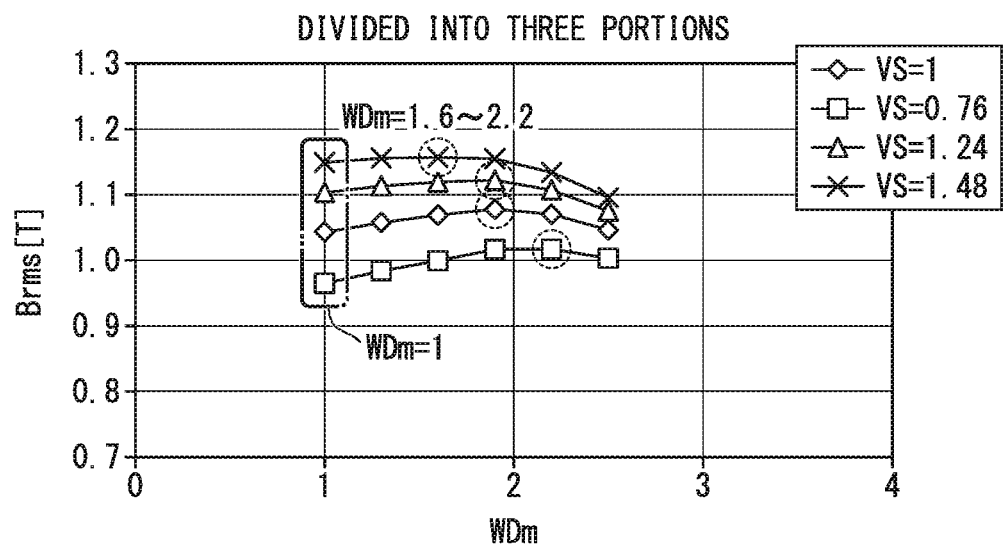
FIG. 10 is a graph describing a relationship between a width of a main magnetic pole of the rotor according to the first modified example and a magnetic flux density effective value.

FIG. 10 is a graph describing a calculation result of a magnetic flux density when widths of the first magnet group 53 and a second magnet group 63 in the circumferential direction Dc are fixed at 3 and a width WDm is changed in the first modified example.

As illustrated in FIG. 10, when a width WDm is set to be 1.6 to 2.2, it is possible to increase a magnetic flux density effective value of a motor gap.

As a second modified example, one auxiliary pole magnet may be disposed between the main magnetic pole magnets adjacent to each other in the circumferential direction Dc.

To be specific, one first auxiliary pole magnet 52 is disposed between the first main magnetic pole magnets 51 adjacent to each other in the circumferential direction Dc with respect to the first magnet layer 50. In other words, one first main magnetic pole magnet 51 and one first auxiliary pole magnet 52 are alternately arranged in the circumferential direction Dc. In this case, the one first main magnetic pole magnet 51 and the one first auxiliary pole magnet 52 are disposed so that the orientations of the magnetic poles sequentially rotate 90° in the first circumferential direction Dc1 in a plane in the circumferential direction Dc.

Figure 11:
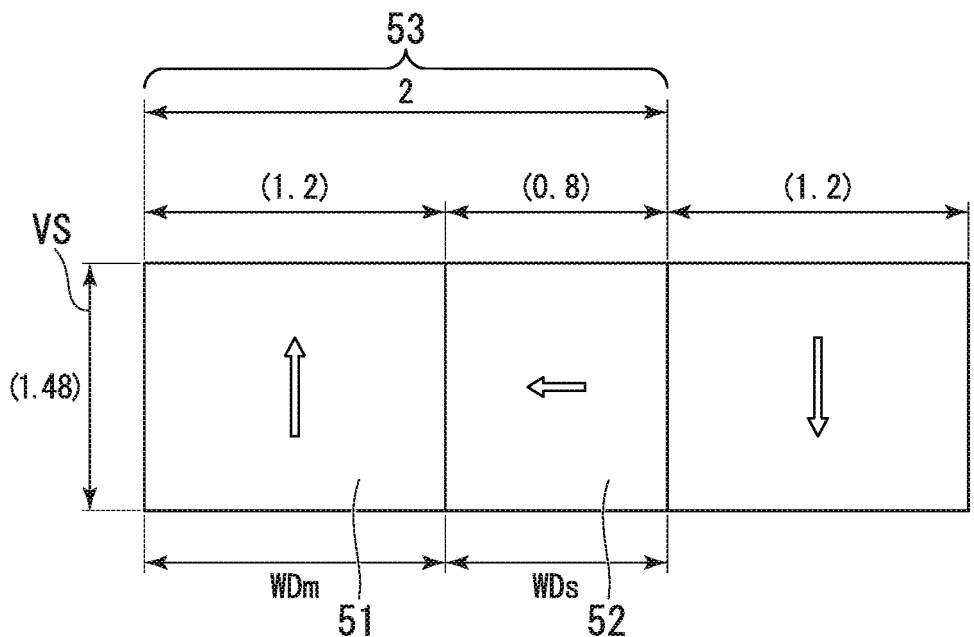
FIG. 11 is a diagram explaining a width of each magnetic pole of a rotor according to a second modified example.

The dimensions of the first main magnetic pole magnet 51 and the first auxiliary pole magnet 52 are set to, for example, the dimensions illustrated in FIG. 11. In FIG. 11, when a width of a first magnet group 53 in the circumferential direction Dc is set to 2, a width WDm of one first main magnetic pole magnet 51 in the circumferential direction Dc in the first magnet group 53 is set to 1.2 and a width WDs of one first auxiliary pole magnet 52 in the circumferential direction Dc in the first magnet group 53 is set to 0.8.

The same applies to a second magnet layer 60.

Figure 12:
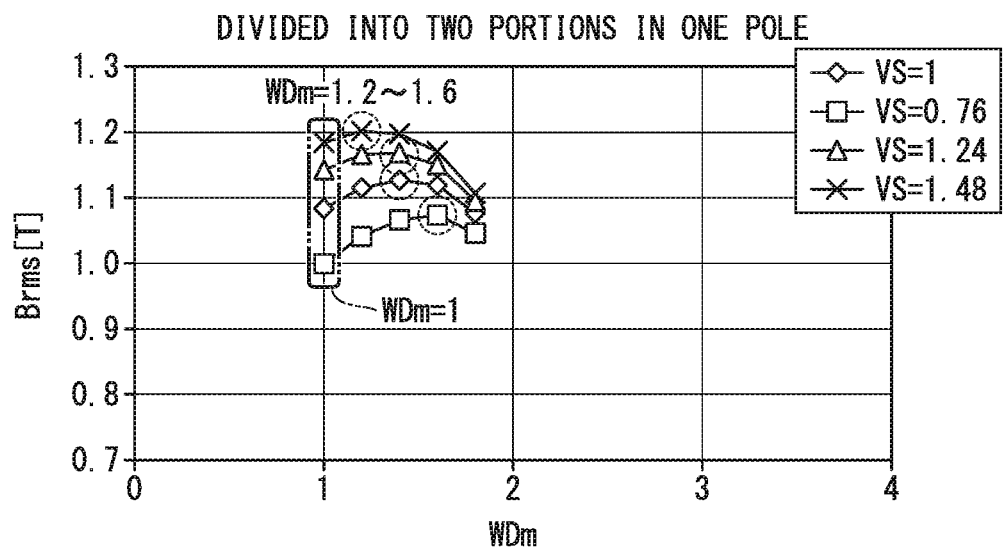
FIG. 12 is a graph describing a relationship between a width of a main magnetic pole of the rotor according to the second modified example and a magnetic flux density effective value.

FIG. 12 is a graph describing a calculation result of a magnetic flux density when widths of the first magnet group 53 and a second magnet group 63 in the circumferential direction Dc are fixed at 2 and a width WDm is changed in the second modified example.

As illustrated in FIG. 12, when a width WDm is set to be 1.2 to 1.6, it is possible to increase a magnetic flux density effective value of a motor gap.

(Method for Manufacturing Rotor)

Figure 13:
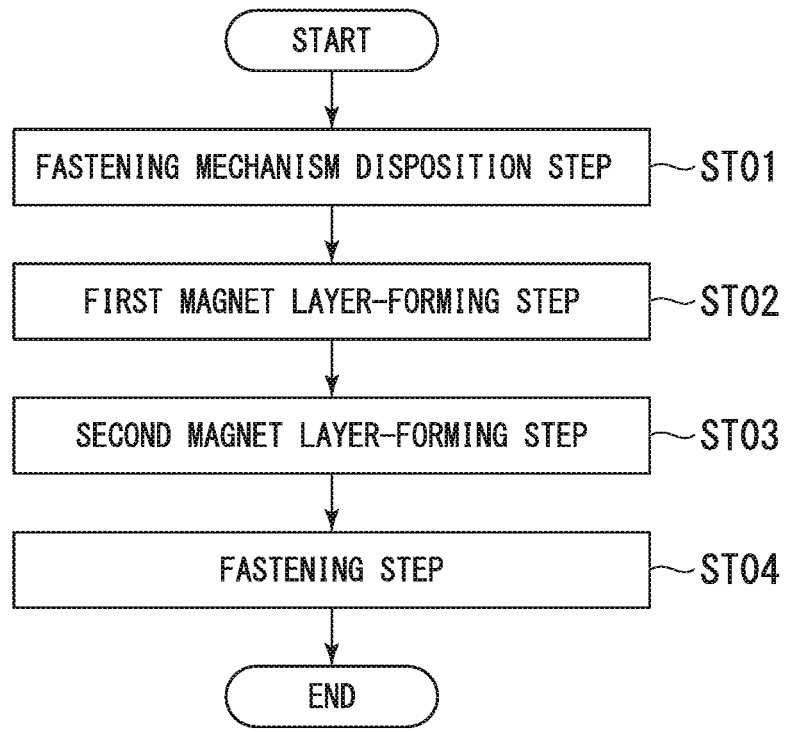
FIG. 13 is a flowchart describing a method for manufacturing the rotor according to the first embodiment of the present invention.

A rotor 30 is manufactured by carrying out steps illustrated in FIG. 13.

First, a first end plate 71 and a rotor structural member 72 are disposed (ST01: a fastening mechanism disposition step). In the fastening mechanism disposition step ST01, the rotor structural member 72 is fixed to the first end plate 71 by bolting a bolt BIT inserted into a hole 71h to a bolt hole 72h. To be specific, an inner ring member 74 and an outer ring member 75 are fixed to the first end plate 71 such that the first end plate 71, the inner ring member 74, and the outer ring member 75 have a coaxial arrangement in which the central axes of the rings coincide with each other.

A ring-shaped space Sv having the first end plate 71 defined as a bottom surface is formed in the rotor structural member 72 by fixing the rotor structural member 72 to the first end plate 71.

Subsequent to the fastening mechanism disposition step ST01, a first magnet layer 50 is formed (ST02: a first magnet layer-forming step). In the first magnet layer-forming step ST02, a plurality of first main magnetic pole magnets 51 and a plurality of first auxiliary pole magnets 52 are arranged in the ring-shaped space Sv in a Halbach array. At that time, the first magnet layer 50 is formed to increase a magnetic field strength on a surface side facing the first end plate 71. The first main magnetic pole magnets 51 and the first auxiliary pole magnets 52 are fixed to a plate surface of the first end plate 71 on the downward direction Da2 side, for example, using an adhesive AD applied to the plate surface of the first end plate 71.

Subsequent to the first magnet layer-forming step ST02, a second magnet layer 60 is formed (ST03: a second magnet layer-forming step). In the second magnet layer-forming step ST03, a plurality of second main magnetic pole magnets 61 and a plurality of second auxiliary pole magnets 62 are arranged in the ring-shaped space Sv in a Halbach array. At that time, the second magnet layer 60 is formed to increase a magnetic field strength on a surface side opposite to a surface facing the first magnet layer 50 (on a surface side facing a second end plate 73). The second main magnetic pole magnets 61 and the plurality of second auxiliary pole magnets 62 are fixed to the first magnet layer 50, for example, using an adhesive AD applied to a first back surface 50b of the first magnet layer 50.

Subsequent to the second magnet layer-forming step ST03, the second end plate 73 is disposed and the first magnet layer 50 and the second magnet layer 60 are fastened (ST04: a fastening step). In the fastening step ST04, an adhesive AD is applied to a plate surface of the second end plate 73 on the upward direction Da1 side and then a bolt BLT inserted into a hole 73h is bolted to a bolt hole 72h. Thus, the second end plate 73 is fixed to the rotor structural member 72. When the second end plate 73 is fixed to the rotor structural member 72, the first magnet layer 50 and the second magnet layer 60 are fastened using the first end plate 71 and the second end plate 73.

(Operation)

When a driving current is supplied to a stator winding 11 and a stator winding 21, rotating magnetic fields which rotate the rotor 30 are generated in a first stator 10 and a second stator 20. Thus, an axial gap motor 1 can rotate the rotor 30 relative to the first stator 10 and the second stator 20. Moreover, the axial gap motor 1 rotates, for example, a shaft or a gear connected to the rotor 30.

(Action and Effect)

In the axial gap motor 1 according to this embodiment, each of the magnetic field strengths in the motor gap is strengthened due to each of the magnet layers in which the main magnetic pole magnet and the auxiliary pole magnet are arranged in a Halbach array. For this reason, it is possible to set the axial gap motor 1 to have a high torque density.

In the axial gap motor 1 according to this embodiment, the first magnet layer 50 whose magnetic field strength is strengthened toward the first stator 10 and the second magnet layer 60 whose magnetic field strength is strengthened toward the second stator 20 are separately constituted. For this reason, it is possible to form the first magnet layer 50 by arranging the magnets of the plurality of first main magnetic pole magnets 51 and the plurality of first auxiliary pole magnets 52 and then to form the second magnet layer 60 by arranging the magnets of the plurality of second main magnetic pole magnets 61 and the plurality of second auxiliary pole magnets 62.

Therefore, the axial gap motor 1 has a structure which is easy to assemble in a state in which the magnets of the first magnet layer 50 and the magnets of the second magnet layer 60 are arranged and assembled.

In the axial gap motor 1 according to this embodiment, the second magnet layer 60 is disposed with respect to the first magnet layer 50 such that the first back surface 50b and a second back surface 60b are opposite to each other. When each of the magnet layers is arranged in a Halbach array, the magnetic field strengths of the first back surface 50b and the second back surface 60b are weaker than those of a first front surface 50a or a second front surface 60a.

For this reason, when the first back surface 50b and the second back surface 60b are disposed to be opposite to each other, a repulsive force between the first back surface 50b and the second back surface 60b is minimized. Therefore, the axial gap motor 1 has a structure which is easier to assemble in a state in which the first magnet layer 50 and the second magnet layer 60 are combined.

In the axial gap motor 1 according to this embodiment, the orientations of the magnetic poles of the first main magnetic pole magnets 51 and the orientations of the magnetic poles of the second main magnetic pole magnets 61 are aligned.

For this reason, when the first back surface 50b and the second back surface 60b are disposed to be opposite to each other, an attractive force is exerted between the first back surface 50b and the second back surface 60b. Therefore, the axial gap motor 1 has a structure which is easier to assemble in a state in which the first magnet layer 50 and the second magnet layer 60 are combined.

In the axial gap motor 1 according to this embodiment, the rotor 30 includes a fastening mechanism 70 configured to fasten the first magnet layer 50 and the second magnet layer 60. Thus, the first magnet layer 50 and the second magnet layer 60 are integrated. For this reason, in a task of assembling the first magnet layer 50 and the second magnet layer 60 between the first stator 10 and the second stator 20, the axial gap motor 1 has a structure which is easy to assemble.

In the axial gap motor 1 according to this embodiment, the first magnet layer 50 and the second magnet layer 60 are positioned using the positioning mechanism 80 with respect to the fastening mechanism 70 in the circumferential direction Dc. For this reason, the slippage of the first magnet layer 50 and the second magnet layer 60 in the circumferential direction Dc is minimized.

Therefore, the axial gap motor 1 can transmit torque to a shaft or a gear connected to the rotor 30.

Modified Examples

In this embodiment, as a positioning mechanism 80, each convex portion 82 is provided in one of magnets arranged in the circumferential direction Dc. As a modified example, each convex portion 82 may be provided in a part of magnets arranged in the circumferential direction Dc. At that time, concave portions 81 are provided at a part of positions opposite to the magnets arranged in the circumferential direction Dc in accordance with the convex portions 82.

In this embodiment, as the positioning mechanism 80, each of the concave portions 81 is provided in an inner circumference of an outer ring member 75.

As a modified example, each concave portion 81 may be provided in an outer circumference of each pair of first main magnetic pole magnets 51 and second main magnetic pole magnets 61 arranged in the axial direction Da. At that time, a plurality of convex portions 82 are provided in an inner circumference of an outer ring member 75.

In this embodiment, as the positioning mechanism 80, the plurality of concave portions 81 and the plurality of convex portions 82 are provided.

As a modified example, only a plurality of convex portions 82 among a plurality of concave portions 81 and the plurality of convex portions 82 may be provided.

In this embodiment, the concave portions 81 are provided in the entire outer ring member 75 in the axial direction Da.

As a modified example, concave portions 81 may be provided in a part of an outer ring member 75 in the axial direction Da. For example, as the concave portions 81 provided in a part of the outer ring member 75 in the axial direction Da, holes or groove obtained by cutting only a central portion in the axial direction Da in an inner circumferential surface of the outer ring member 75 may be provided. In this case, convex portions 82 have shapes in which the convex portions 82 are fitted into the cut holes or grooves.

In this embodiment, the bolt BLT inserted into the hole 71h and the hole 73h is screwed into each bolt hole 72h which is a screw hole. As a modified example, a bolt hole 72h may be a hole through which a bolt BLT passes from a hole 71h toward a hole 73h. In this case, each bolt BLT inserted into the hole 71h and the hole 73h is tightened with a nut or the like via a bolt hole 72h formed as a through hole. Thus, a first end plate 71 and a second end plate 73 are fixed to a rotor structural member 72. The bolt hole 72h formed as a through hole may not be a screw hole.

Although the inner ring member 74 and the outer ring member 75 in this embodiment are divided into four portions in the circumferential direction Dc, if the inner ring member 74 and the outer ring member 75 can form a ring shape as an integral member, as a modified example, an inner ring member 74 and an outer ring member 75 may not be divided in the circumferential direction Dc. As another modified example, an inner ring member 74 and an outer ring member 75 may be divided into the number of divisions (two divisions, six divisions, eight divisions, and the like) other than four divisions in the circumferential direction Dc.

In this embodiment, in a cross-sectional view in the axial direction Da, each of the concave portions 81 has a shape in which the concave portion 81 is cut in a circular arc and each of the convex portions 82 has a shape in which the convex portion 82 protrudes in a circular arc.

As a modified example, each concave portion and each convex portion may have any shapes as long as their shapes are a combination of shapes in which they can be fitted.

For example, in a cross-sectional view in the axial direction Da, each concave portion may be a shape cut in a rectangular shape. In this case, in the cross-sectional view in the axial direction Da, each convex portion is set to a shape in which the convex portion protrudes in a rectangular shape to be fitted into each of the concave portions.

As another example, in a cross-sectional view in the axial direction Da, each concave portion may be a shape cut in a V shape. In this case, in the cross-sectional view in the axial direction Da, each convex portion is set to have a shape in which the convex portion protrudes in a V shape to be fitted to each of the concave portions.

In this embodiment, an adhesive AD is used at the time of assembling each magnet and each end plate. As a modified example, an adhesive AD may not be used if each magnet and each end plate can be assembled only using fastening through a fastening mechanism.

Second Embodiment

An axial gap motor according to a second embodiment will be described in detail below with reference to FIG. 14.

The axial gap motor according to this embodiment is basically the same as that of the first embodiment, but this embodiment and the first embodiment differ in that a positioning mechanism of a rotor in this embodiment is a beam structure.

An axial gap motor 101 according to this embodiment includes a first stator 10, a second stator 20, a rotor 130, and a frame 40.

Figure 14:
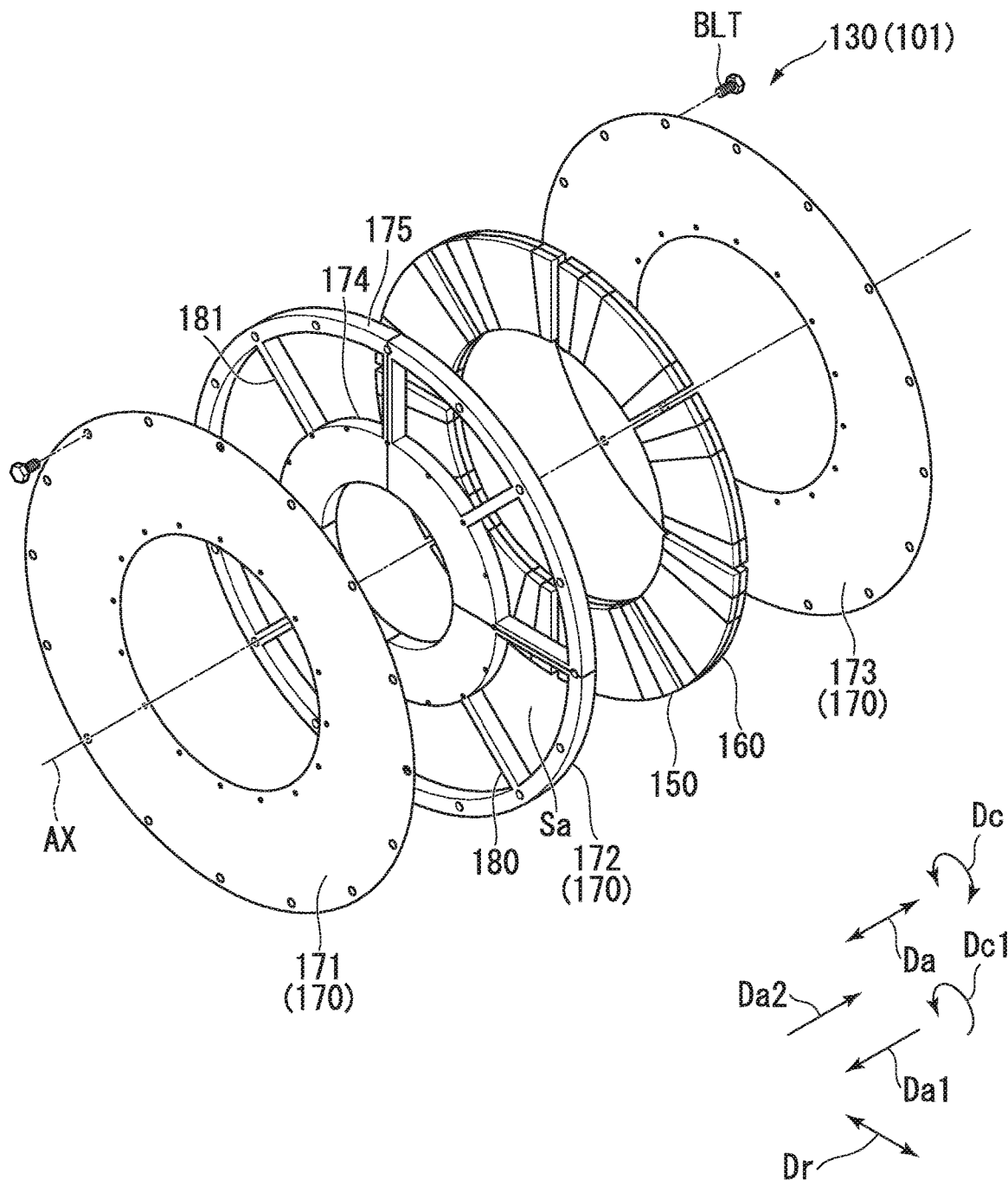
FIG. 14 is an exploded perspective view of a rotor according to a second embodiment of the present invention.

As illustrated in FIG. 14, the rotor 130 includes a first magnet layer 150, a second magnet layer 160, a fastening mechanism 170, and a positioning mechanism 180.

The fastening mechanism 170 includes a first end plate 171, a rotor structural member 172, and a second end plate 173.

The fastening mechanism 170 fastens the first magnet layer 150 and the second magnet layer 160.

The rotor structural member 172 has a ring-shaped inner ring member 174 and a ring-shaped outer ring member 175.

In this embodiment, each of the inner ring member 174 and the outer ring member 175 has a substantially annular shape. In addition, the inner ring member 174 and the outer ring member 175 are fixed to the first end plate 171 and the second end plate 173 such that the first end plate 171, the second end plate 173, the inner ring member 174, and the outer ring member 175 have a coaxial arrangement in which central axes of rings thereof all coincide with an axis AX.

The first magnet layer 150 and the second magnet layer 160 are accommodated between the inner ring member 174 and the outer ring member 175.

The first end plate 171 and the second end plate 173 are fastened to each other via the rotor structural member 172 by being subjected to screwing using a bolt BLT. Thus, the fastening mechanism 170 fastens the first magnet layer 150 and the second magnet layer 160 in the axial direction Da.

In this embodiment, the first end plate 171 overlaps the rotor structural member 172 in the radial direction Dr. Likewise, the second end plate 173 overlaps the rotor structural member 172 in the radial direction Dr. For this reason, the first end plate 171 and the second end plate 173 are screwed at portions at which the first end plate 171 and the second end plate 173 overlap the rotor structural member 172 to fasten the first magnet layer 150 and the second magnet layer 160 from the axial direction Da.

(Positioning Mechanism)

The positioning mechanism 180 positions the first magnet layer 150 and the second magnet layer 160 in the circumferential direction Dc with respect to the fastening mechanism 170.

As the positioning mechanism 180, a plurality of beams 181 are provided between the outer ring member 175 and the inner ring member 174. Each of the beams 181 extends from the outer ring member 175 to the inner ring member 174 in the radial direction and structurally joins the outer ring member 175 and the inner ring member 174.

In this embodiment, eight beams 181 are provided at intervals of 45° toward the circumferential direction Dc.

The plurality of beams 181 divide the space Sv between the inner ring member 174 and the outer ring member 175 in the circumferential direction and define a plurality of arch-shaped spaces Sa. The first magnet layer 150 and the second magnet layer 160 are accommodated in each of the arch-shaped spaces Sa. The first magnet layer 150 and the second magnet layer 160 are divided and accommodated in the circumferential direction Dc to match each of the arch-shaped spaces Sa. Therefore, each of the beams 181 determines relative positions of the divided first magnet layer 150 and second magnet layer 160 in the circumferential direction Dc.

(Action and Effect)

In the axial gap motor 101 according to this embodiment, the first magnet layer 150 and the second magnet layer 160 are formed separately as in the first embodiment. Therefore, the axial gap motor 101 has a structure which is easy to assemble in a state in which the magnets of the first magnet layer 150 and the magnets of the second magnet layer 160 are arranged and assembled.

In the axial gap motor 101 according to this embodiment, a repulsive force between the first magnet layer 150 and the second magnet layer 160 is minimized as in the first embodiment. In addition, an attractive force is exerted between the first magnet layer 150 and the second magnet layer 160. Therefore, the axial gap motor 101 has a structure which is easier to assemble in a state in which the first magnet layer 150 and the second magnet layer 160 are combined.

In the axial gap motor 101 according to this embodiment, the first magnet layer 150 and the second magnet layer 160 are positioned in the circumferential direction Dc with respect to the fastening mechanism 170 using the positioning mechanism 180 as in the first embodiment. For this reason, the slippage of the first magnet layer 150 and the second magnet layer 160 in the circumferential direction Dc is prevented.

Therefore, the axial gap motor 101 can transmit torque to a shaft or a gear connected to the rotor 130.

Third Embodiment

An axial gap motor according to a third embodiment will be described in detail below with reference to FIG. 15.

The axial gap motor according to this embodiment is basically the same as that of the first embodiment, but this embodiment and the first embodiment differ in that a rotor in this embodiment does not have a positioning mechanism.

An axial gap motor 201 according to this embodiment includes a first stator 10, a second stator 20, a rotor 230, and a frame 40.

Figure 15:
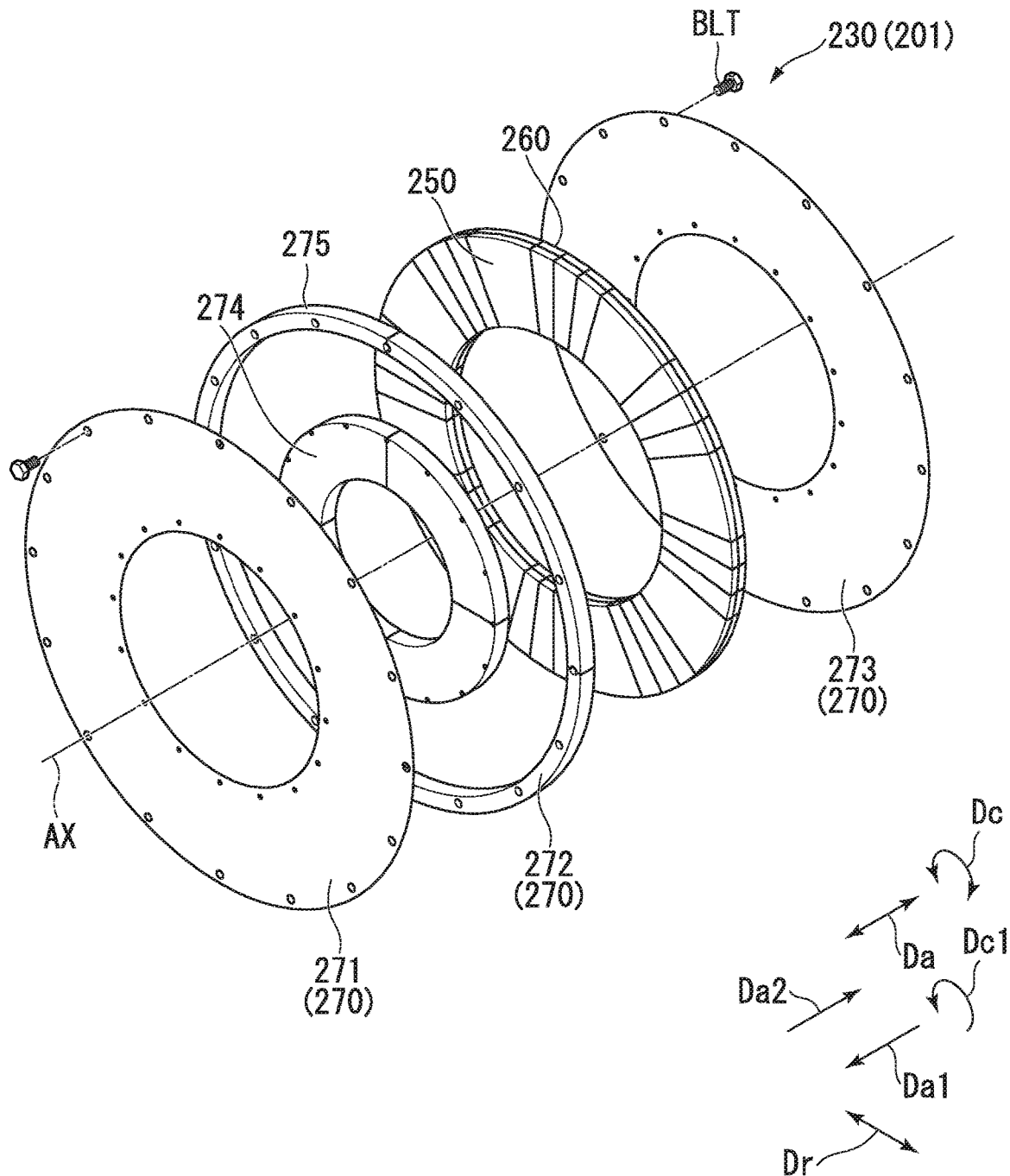
FIG. 15 is an exploded perspective view of a rotor according to a third embodiment of the present invention.

As illustrated in FIG. 15, the rotor 230 includes a first magnet layer 250, a second magnet layer 260, and a fastening mechanism 270.

The fastening mechanism 270 includes a first end plate 271, a rotor structural member 272, and a second end plate 273.

The fastening mechanism 270 fastens the first magnet layer 250 and the second magnet layer 260.

The rotor structural member 272 has a ring-shaped inner ring member 274 and a ring-shaped outer ring member 275.

In this embodiment, each of the inner ring member 274 and the outer ring member 275 has a substantially annular shape. In addition, the inner ring member 274 and the outer ring member 275 are fixed to the first end plate 271 and the second end plate 273 such that the first end plate 271, the second end plate 273, the inner ring member 274, and the outer ring member 275 have a coaxial arrangement in which central axes of rings thereof all coincide with an axis AX.

The first magnet layer 250 and the second magnet layer 260 are accommodated between the inner ring member 274 and the outer ring member 275.

The first end plate 271 and the second end plate 273 are fastened to each other via the rotor structural member 272 by being subjected to screwing using a bolt BLT. Thus, the fastening mechanism 270 fastens the first magnet layer 250 and the second magnet layer 260 in the axial direction Da.

(Action and Effect)

In the axial gap motor 201 according to this embodiment, the first magnet layer 250 and the second magnet layer 260 are formed separately as in the first embodiment. Therefore, the axial gap motor 201 has a structure which is easy to assemble in a state in which the magnets of the first magnet layer 250 and the magnets of the second magnet layer 260 are arranged and assembled.

In the axial gap motor 201 according to this embodiment, a repulsive force between the first magnet layer 250 and the second magnet layer 260 is minimized as in the first embodiment. In addition, an attractive force is exerted between the first magnet layer 250 and the second magnet layer 260. Therefore, the axial gap motor 201 has a structure which is easier to assemble in a state in which the first magnet layer 250 and the second magnet layer 260 are combined.

In the axial gap motor 201 according to this embodiment, the first magnet layer 250 and the second magnet layer 260 are positioned in the circumferential direction Dc with respect to the fastening mechanism 270 through an adhesive force using an adhesive AD and a fastening force using the fastening mechanism 270. For this reason, the slippage of the first magnet layer 250 and the second magnet layer 260 in the circumferential direction Dc is prevented.

Therefore, the axial gap motor 201 can transmit torque to a shaft or a gear connected to the rotor 230.

Modified Example

In this embodiment, the adhesive AD is used at the time of assembling each magnet and each end plate. As a modified example, an adhesive AD may not be used as long as the positional deviation of a first magnet layer 250 and a second magnet layer 260 in the circumferential direction Dc can be prevented only using a fastening force. In this case, an axial gap motor 201 minimizes the positional deviation of the first magnet layer 250 and the second magnet layer 260 in the circumferential direction Dc with respect to a fastening mechanism 270 using a fastening force.

Fourth Embodiment

An axial gap motor according to a fourth embodiment will be described in detail below with reference to FIG. 16.

The axial gap motor according to this embodiment is basically the same as that of the first embodiment, but this embodiment and the first embodiment differ in that a positioning mechanism of a rotor in this embodiment corresponds to concave portions and convex portions which are opposite to each other in the axial direction Da.

An axial gap motor 301 according to this embodiment includes a first stator 10, a second stator 20, a rotor 330, and a frame 40.

Figure 16:
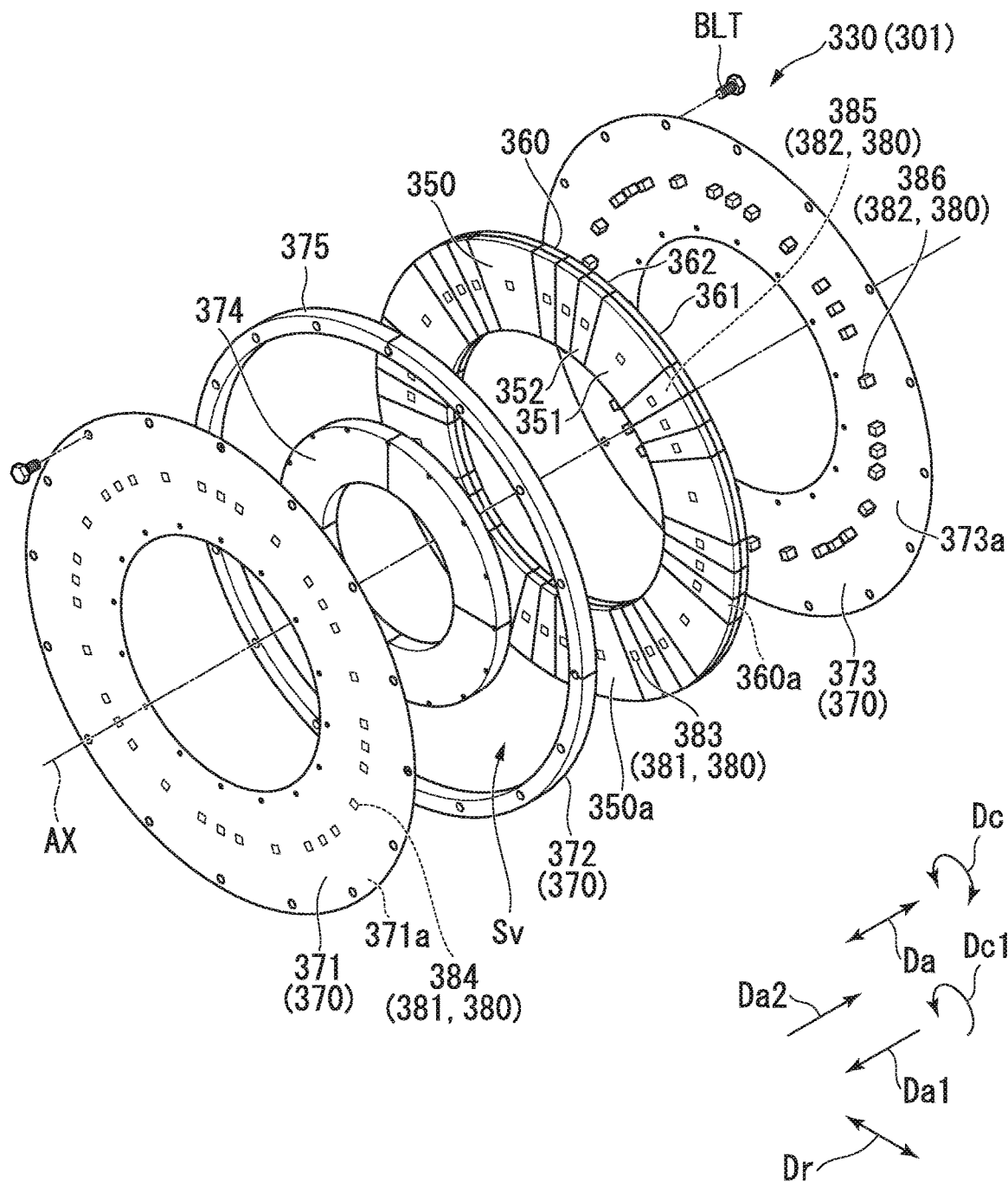
FIG. 16 is an exploded perspective view of a rotor according to a fourth embodiment of the present invention.

As illustrated in FIG. 16, the rotor 330 includes a first magnet layer 350, a second magnet layer 360, a fastening mechanism 370, and a positioning mechanism 380.

The fastening mechanism 370 includes a first end plate 371, a rotor structural member 372, and a second end plate 373.

The fastening mechanism 370 fastens the first magnet layer 350 and the second magnet layer 360.

The rotor structural member 372 has a ring-shaped inner ring member 374 and a ring-shaped outer ring member 375. In this embodiment, each of the inner ring member 374 and the outer ring member 375 has a substantially annular shape.

The inner ring member 374 and the outer ring member 375 are fixed to the first end plate 371 and the second end plate 373 such that the first end plate 371, the second end plate 373, the inner ring member 374, and the outer ring member 375 have a coaxial arrangement in which central axes of rings thereof all coincide with an axis AX.

The first magnet layer 350 includes a plurality of first main magnetic pole magnets 351 (main magnetic poles) and a plurality of first auxiliary pole magnets 352 (auxiliary poles).

The first magnet layer 350 has a first front surface 350a on the upward direction Da1 side.

The first front surface 350a in the first magnet layer 350 faces the first end plate 371.

The second magnet layer 360 includes a plurality of second main magnetic pole magnets 361 (main magnetic poles) and a plurality of second auxiliary pole magnets 362 (Auxiliary poles).

The second magnet layer 360 has a second surface 360a on the downward direction Da2 side.

The second surface 360a in the second magnet layer 360 faces the second end plate 373.

The first magnet layer 350 and the second magnet layer 360 are accommodated between the inner ring member 374 and the outer ring member 375.

The first end plate 371 has a plate surface 371a opposite to the first front surface 350a.

The second end plate 373 has a plate surface 373a opposite to the second surface 360a.

The first end plate 371 and the second end plate 373 are fastened to each other via the rotor structural member 372 by being subjected to screwing using a bolt BLT. Thus, the fastening mechanism 370 fastens the first magnet layer 350 and the second magnet layer 360 in the axial direction Da.

(Positioning Mechanism)

The positioning mechanism 380 positions the first magnet layer 350 and the second magnet layer 360 in the circumferential direction Dc with respect to the fastening mechanism 370.

The positioning mechanism 380 includes a first positioning mechanism 381 and a second positioning mechanism 382.

A plurality of concave portions 383 and a plurality of convex portions 384 are provided as the first positioning mechanism 381. Pairs of the concave portions 383 and the convex portions 384 are opposite to each other in the axial direction Da.

A plurality of concave portions 385 and a plurality of convex portions 386 are provided as the second positioning mechanism 382. Pairs of the concave portions 385 and the convex portions 386 are opposite to each other in the axial direction Da.

The plurality of concave portions 383 are provided in the first front surface 350a in the first magnet layer 350 to be arranged in the circumferential direction Dc. Each of the concave portions 383 is recessed in a concave shape from the first front surface 350a in the axial direction Da.

In this embodiment, each of the concave portions 383 is recessed in a prismatic shape extending from the first front surface 350a in the axial direction Da.

In addition, in this embodiment, each of the concave portions 383 is provided in each of the first main magnetic pole magnets 351 and each of the first auxiliary pole magnets 352.

The plurality of convex portions 384 are provided on the plate surface 371a in the first end plate 371 to be arranged in the circumferential direction Dc. Each of the convex portions 384 protrudes in a convex shape from the plate surface 371a in the axial direction Da.

In this embodiment, each of the convex portions 384 protrudes in a prismatic shape extending in the axial direction Da from the plate surface 371a toward each of the concave portions 383.

A position in the circumferential direction Dc at which each of the convex portions 384 is provided coincides with a position in the circumferential direction Dc at which each of the concave portions 383 is provided. A shape of each of the convex portions 384 coincides with a shape of each of the concave portions 383. For this reason, when each of the concave portions 383 is fitted into each of the convex portions 384, a relative position of the first magnet layer 350 in the circumferential direction Dc with respect to the first end plate 371 is determined.

The plurality of concave portions 385 are provided in the second surface 360a in the second magnet layer 360 to be arranged in the circumferential direction Dc. Each of the concave portions 385 is recessed in a concave shape from the second surface 360a in the axial direction Da.

In this embodiment, each of the concave portions 385 is recessed in a prismatic shape extending from the second surface 360a in the axial direction Da.

In addition, in this embodiment, each of the concave portions 385 is provided in each of the second main magnetic pole magnets 361 and each of the second auxiliary pole magnets 362.

The plurality of convex portions 386 are provided on the plate surface 373a in the second end plate 373 to be arranged in the circumferential direction Dc. Each of the convex portions 386 protrudes in a convex shape from the plate surface 373a in the axial direction Da.

In this embodiment, each of the convex portions 386 protrudes in a prismatic shape extending in the axial direction Da from the plate surface 373a toward each of the concave portions 385.

A position in the circumferential direction Dc at which each of the convex portions 386 is provided coincides with a position in the circumferential direction Dc at which each of the concave portions 385 is provided. A shape of each of the convex portions 386 coincides with a shape of each of the concave portions 385. For this reason, when each of the concave portions 385 is fitted into each of the convex portions 386, a relative position of the second magnet layer 360 in the circumferential direction Dc with respect to the second end plate 373 is determined.

(Action and Effect)

In the axial gap motor 301 according to this embodiment, the first magnet layer 350 and the second magnet layer 360 are formed separately as in the first embodiment. Therefore, the axial gap motor 301 has a structure which is easy to assemble in a state in which the magnets of the first magnet layer 350 and the magnets of the second magnet layer 360 are arranged and assembled.

In the axial gap motor 301 according to this embodiment, a repulsive force between the first magnet layer 350 and the second magnet layer 360 is minimized as in the first embodiment. In addition, an attractive force is exerted between the first magnet layer 350 and the second magnet layer 360. Therefore, the axial gap motor 301 has a structure which is easier to assemble in a state in which the first magnet layer 350 and the second magnet layer 360 are combined.

In the axial gap motor 301 according to this embodiment, the first magnet layer 350 and the second magnet layer 360 are positioned in the circumferential direction Dc with respect to the fastening mechanism 370 using the positioning mechanism 380 as in the first embodiment. For this reason, the slippage of the first magnet layer 350 and the second magnet layer 360 in the circumferential direction Dc is prevented. Therefore, the axial gap motor 301 can transmit torque to a shaft or a gear connected to the rotor 330.

Modified Example

In this embodiment, each of the concave portions 383 is provided in each of the first main magnetic pole magnets 351 and each of the first auxiliary pole magnets 352 as the first positioning mechanism 381.

As a modified example, a plurality of concave portions 383 may be provided in a part of each first main magnetic pole magnet 351 and each first auxiliary pole magnet 352. At that time, a plurality of convex portions 384 may also be provided in a part of each of the first main magnetic pole magnets 351 and each of the first auxiliary pole magnets 352 in accordance with the plurality of concave portions 383. Also with respect to a second positioning mechanism 382, a plurality of concave portions 385 may be provided in a part of each second main magnetic pole magnet 361 and each second auxiliary pole magnet 362. At that time, a plurality of convex portions 386 may also be provided in a part of each of the second main magnetic pole magnets 361 and each of the second auxiliary pole magnets 362 in accordance with the plurality of concave portions 385.

In this embodiment, the convex portions 384 are provided in the plate surface 371a in the first end plate 371 and the concave portions 383 are provided in the first front surface 350a in the first magnet layer 350 as the first positioning mechanism 381.

As a modified example, concave portions may be provided in a plate surface 371a in a first end plate 371 and convex portions may be provided on a first front surface 350a in a first magnet layer 350. Also with respect to a second positioning mechanism 382, concave portions may be provided in a plate surface 373a in a second end plate 373 and convex portions may be provided on a second surface 360a in a second magnet layer 360.

In this embodiment, the plurality of concave portions 383 and the plurality of convex portions 384 are provided as the first positioning mechanism 381.

As a modified example, only a plurality of convex portions 384 of a plurality of concave portions 383 and the plurality of convex portions 384 may be provided. Also with respect to a second positioning mechanism 382, only a plurality of convex portions 386 of a plurality of concave portions 385 and the plurality of convex portions 386 may be provided.

Fifth Embodiment

An axial gap motor according to a fifth embodiment will be described in detail below with reference to FIG. 17.

The axial gap motor according to this embodiment is basically the same as that of the first embodiment, but this embodiment and the first embodiment differ in that a positioning mechanism of a rotor in this embodiment is a planar portion.

An axial gap motor 401 according to this embodiment includes a first stator 10, a second stator 20, a rotor 430, and a frame 40.

Figure 17:
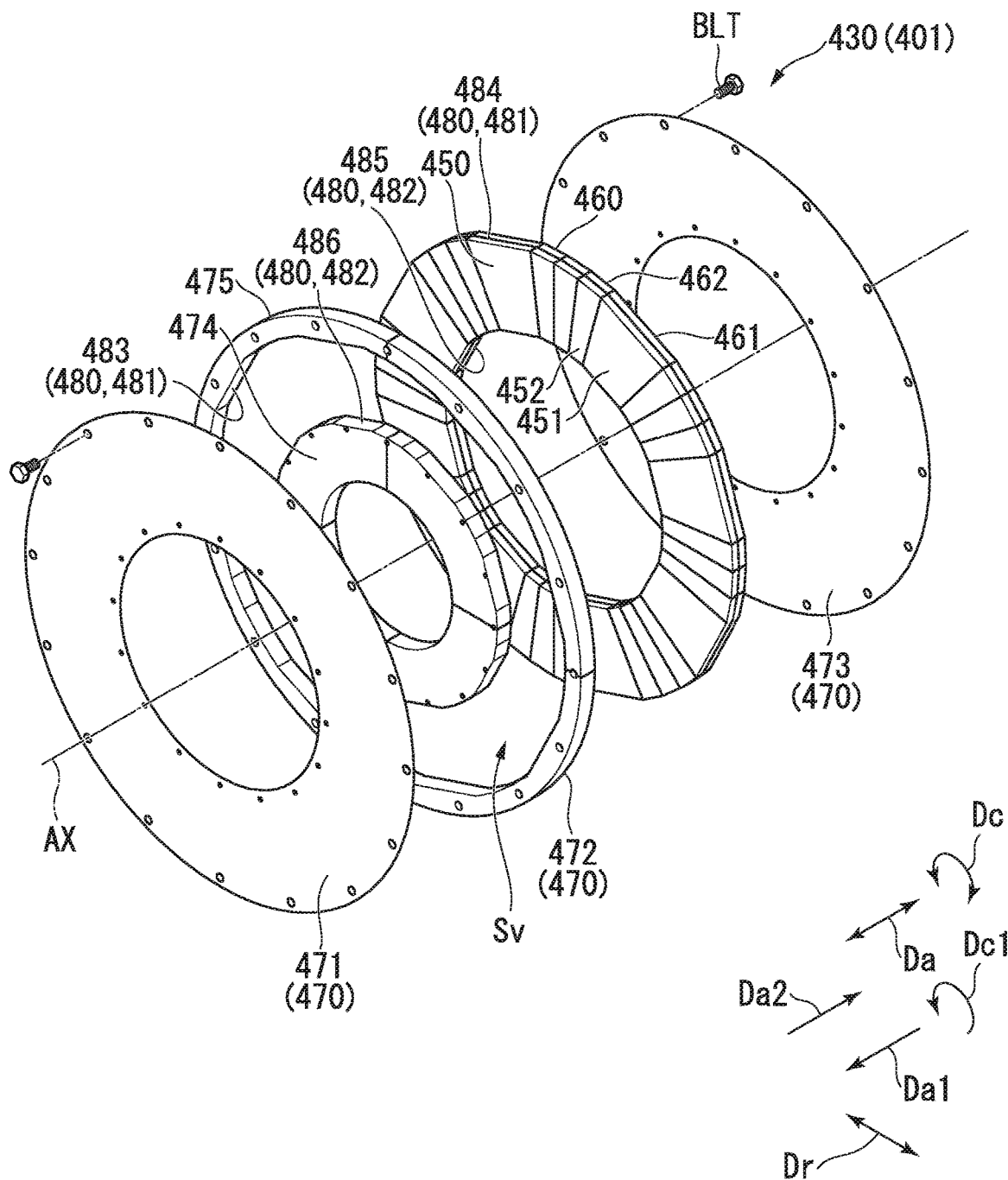
FIG. 17 is an exploded perspective view of a rotor according to a fifth embodiment of the present invention.

As illustrated in FIG. 17, the rotor 430 includes a first magnet layer 450, a second magnet layer 460, a fastening mechanism 470, and a positioning mechanism 480.

The fastening mechanism 470 includes a first end plate 471, a rotor structural member 472, and a second end plate 473.

The fastening mechanism 470 fastens the first magnet layer 450 and the second magnet layer 460.

The rotor structural member 472 has a ring-shaped inner ring member 474 and a ring-shaped outer ring member 475.

In this embodiment, each of the inner ring member 474 and the outer ring member 475 has a substantially annular shape. In addition, the inner ring member 474 and the outer ring member 475 are fixed to the first end plate 471 and the second end plate 473 such that the first end plate 471, the second end plate 473, the inner ring member 474, and the outer ring member 475 have a coaxial arrangement in which central axes of rings thereof all coincide with an axis AX.

The first magnet layer 450 includes a plurality of first main magnetic pole magnets 451 (main magnetic poles) and a plurality of first auxiliary pole magnets 452 (auxiliary poles).

The second magnet layer 460 includes a plurality of second main magnetic pole magnets 461 (main magnetic poles) and a plurality of second auxiliary pole magnets 462 (auxiliary poles).

Each of the first main magnetic pole magnets 451 is paired with each of the second main magnetic pole magnets 461 arranged in the axial direction Da. In each pair, a position of the first main magnetic pole magnet 451 in the circumferential direction Dc and a position of the second main magnetic pole magnet 461 in the circumferential direction Dc are aligned.

Likewise, each of the first auxiliary pole magnets 452 is paired with each of the second auxiliary pole magnets 462 arranged in the axial direction Da. In each pair, a position of the first auxiliary pole magnet 452 in the circumferential direction Dc and a position of the second auxiliary pole magnet 462 in the circumferential direction Dc are aligned.

The first magnet layer 450 and the second magnet layer 460 are accommodated between the inner ring member 474 and the outer ring member 475.

The first end plate 471 and the second end plate 473 are fastened to each other via the rotor structural member 472 by being subjected to screwing using a bolt BLT. Thus, the fastening mechanism 470 fastens the first magnet layer 450 and the second magnet layer 460 in the axial direction Da.

(Positioning Mechanism)

The positioning mechanism 480 positions the first magnet layer 450 and the second magnet layer 460 in the circumferential direction Dc with respect to the fastening mechanism 470.

The positioning mechanism 480 includes a first positioning mechanism 481 and a second positioning mechanism 482.

A plurality of planar portions 483 and a plurality of planar portions 484 are provided in an arrangement manner in the circumferential direction Dc as the first positioning mechanism 481.

A plurality of planar portions 485 and a plurality of planar portions 486 are provided in an arrangement manner in the circumferential direction Dc as the second positioning mechanism 482.

(First Positioning Mechanism)

The plurality of planar portions 483 are provided on an inner circumferential surface of the outer ring member 475 to be arranged in the circumferential direction Dc. In this embodiment, the plurality of planar portions 483 are the inner circumferential surface of the outer ring member 475.

Each of the planar portions 483 is provided at a position in which each of the planar portions 483 is opposite to each of the planar portions 484.

The planar portions 483 have planes in which the planar portions 483 intersect each other in the radial direction Dr.

The plurality of planar portions 484 are arranged in the circumferential direction Dc. Each of the planar portions 484 is provided from an outer circumferential surface of the first magnet layer 450 to an outer circumferential surface of the second magnet layer 460 in the axial direction Da.

Each of the planar portions 484 is provided on each pair of the first main magnetic pole magnets 451 and the second main magnetic pole magnets 461 arranged in the axial direction Da and is provided on each pair of the first auxiliary pole magnets 452 and the second auxiliary pole magnets 462 arranged in the axial direction Da.

In this embodiment, one of the planar portions 484 is set in accordance with an outer circumferential surface of the first main magnetic pole magnet 451 in the radial direction Dr and an outer circumferential surface of the second main magnetic pole magnet 461 in the radial direction Dr in each pair. Likewise, one of the planar portions 484 is set in accordance with an outer circumferential surface of the first auxiliary pole magnet 452 in the radial direction Dr and an outer circumferential surface of the second auxiliary pole magnet 462 in the radial direction Dr in each pair.

A position in the circumferential direction Dc in which each of the planar portions 484 is provided coincides with a position in the circumferential direction Dc in which each of the planar portions 483 is provided. A shape of each of the planar portions 484 coincides with a shape of each of the planar portions 483. A direction in which each of the planar portions 484 faces is opposite to a direction in which each of the planar portions 483 faces.

For this reason, when the first magnet layer 450 and the second magnet layer 460 are accommodated between the inner ring member 474 and the outer ring member 475, each of the planar portions 484 is along each of the planar portions 483. Therefore, the outer ring member 475 is fitted into the first magnet layer 450 and the second magnet layer 460 and determines relative positions of the first magnet layer 450 and the second magnet layer 460 in the circumferential direction Dc.

(Second Positioning Mechanism)

The plurality of planar portions 486 are provided on an outer circumferential surface of the inner ring member 474 to be arranged in the circumferential direction Dc. In this embodiment, the plurality of planar portions 486 correspond to an outer circumferential surface of the inner ring member 474.

Each of the planar portions 486 is provided at a position in which each of the planar portions 486 is opposite to each of the planar portions 485.

The planar portions 486 have planes in which the planar portions 486 intersect each other in the radial direction Dr.

The plurality of planar portions 485 are arranged in the circumferential direction Dc. Each of the planar portions 485 is provided from the inner circumferential surface of the first magnet layer 450 to the inner circumferential surface of the second magnet layer 460 in the axial direction Da.

Each of the planar portions 485 is provided on each pair of the first main magnetic pole magnets 451 and the second main magnetic pole magnets 461 arranged in the axial direction Da and is provided on each pair of the first auxiliary pole magnets 452 and the second auxiliary pole magnets 462 arranged in the axial direction Da.

In this embodiment, one of the planar portions 485 is set in accordance with the inner circumferential surface of the first main magnetic pole magnets 451 in the radial direction Dr and the inner circumferential surface of the second main magnetic pole magnets 461 in the radial direction Dr in each pair. Likewise, one of the planar portions 485 is set in accordance with an inner circumferential surface of the first auxiliary pole magnets 452 in the radial direction Dr and the inner circumferential surface of the second auxiliary pole magnets 462 in the radial direction Dr in each pair.

A position in the circumferential direction Dc in which each of the planar portions 485 is provided coincides with a position in the circumferential direction Dc in which each of the planar portions 486 is provided. A shape of each of the planar portions 485 coincides with a shape of each of the planar portions 486. A direction in which each of the planar portions 485 faces is opposite to a direction in which each of the planar portions 486 faces.

For this reason, when the first magnet layer 450 and the second magnet layer 460 are accommodated between the inner ring member 474 and the outer ring member 475, each of the planar portions 485 is along each of the planar portions 486. Therefore, the inner ring member 474 is fitted into the first magnet layer 450 and the second magnet layer 460 and determines relative positions of the first magnet layer 450 and the second magnet layer 460 in the circumferential direction Dc.

(Action and Effect)

In the axial gap motor 401 according to this embodiment, the first magnet layer 450 and the second magnet layer 460 are formed separately as in the first embodiment. Therefore, the axial gap motor 401 has a structure which is easy to assemble in a state in which the magnets of the first magnet layer 450 and the magnets of the second magnet layer 460 are arranged and assembled.

In the axial gap motor 401 according to this embodiment, a repulsive force between the first magnet layer 450 and the second magnet layer 460 is minimized as in the first embodiment. In addition, an attractive force is exerted between the first magnet layer 450 and the second magnet layer 460. Therefore, the axial gap motor 401 has a structure which is easier to assemble in a state in which the first magnet layer 450 and the second magnet layer 460 are combined.

In the axial gap motor 401 according to this embodiment, the first magnet layer 450 and the second magnet layer 460 are positioned in the circumferential direction Dc with respect to the fastening mechanism 470 using the positioning mechanism 480 as in the first embodiment. For this reason, the slippage of the first magnet layer 450 and the second magnet layer 460 in the circumferential direction Dc is prevented. Therefore, the axial gap motor 401 can transmit torque to a shaft or a gear connected to the rotor 430.

Since each of the magnets in the axial gap motor 401 according to this embodiment has planar outer circumferential surface and inner circumferential surface in the radial direction Dr, each of the magnets has a trapezoidal shape with respect to a cross section in the axial direction Da. For this reason, each of the magnets has a shape which is easy to machine.

Modified Example

In this embodiment, the first positioning mechanism 481 and the second positioning mechanism 482 are provided.

As a modified example, only any one of a first positioning mechanism 481 and a second positioning mechanism 482 may be provided.

In this embodiment, with respect to the first positioning mechanism 481, each of the planar portions 484 is provided for each pair of the magnets.

As a modified example, a plurality of planar portions 484 may be provided in a part of each pair of the magnets arranged in the circumferential direction Dc. At that time, a plurality of planar portions 483 are also provided in a part of the positions in the circumferential direction Dc in accordance with the plurality of planar portions 484. Also with respect to the second positioning mechanism 482, a plurality of planar portions 485 may be provided in a part of each pair of the magnets arranged in the circumferential direction Dc. At that time, a plurality of planar portions 486 are also provided in a part of the positions in the circumferential direction Dc in accordance with a plurality of planar portions 485.

While several embodiments of the present invention have been described above, these embodiments are presented by way of examples and are not intended to limit the scope of the invention. These embodiments can be implemented in various other forms and various omissions, substitutions, and changes are possible without departing from the gist of the invention. These embodiments and modifications thereof are included in the scope and gist of the invention as well as within the invention described in the claims and the equivalent scope thereof.

According to the above-described embodiments, an axial gap motor is easy to assemble.

EXPLANATION OF REFERENCES

1 Axial gap motor
10 First stator
11 Stator winding
20 Second stator
21 Stator winding
30 Rotor
40 Frame
50 First magnet layer
50a First front surface
50b First back surface
51 First main magnetic pole magnet
52 First auxiliary pole magnet
53 First magnet group
60 Second magnet layer
60a Second surface
60b Second back surface
61 Second main magnetic pole magnet
62 Second auxiliary pole magnet
63 Second magnet group
70 Fastening mechanism
71 First end plate
71h Hole
72 Rotor structural member
72h Bolt hole
73 Second end plate
73h Hole
74 Inner ring member
75 Outer ring member
80 Positioning mechanism
81 Concave portion
82 Convex portion
101 Axial gap motor
130 Rotor
150 First magnet layer
160 Second magnet layer
170 Fastening mechanism
171 First end plate
172 Rotor structural member
173 Second end plate
174 Inner ring member
175 Outer ring member
180 Positioning mechanism
181 Beam
201 Axial gap motor
230 Rotor
250 First magnet layer
260 Second magnet layer
270 Fastening mechanism
271 First end plate
272 Rotor structural member
273 Second end plate
274 Inner ring member
275 Outer ring member
301 Axial gap motor
330 Rotor
350 First magnet layer
350a First front surface
351 First main magnetic pole magnet
352 First auxiliary pole magnet
360 Second magnet layer
360a Second surface
361 Second main magnetic pole magnet
362 Second auxiliary pole magnet
370 Fastening mechanism
371 First end plate
371a Plate surface
372 Rotor structural member
373 Second end plate
373a Plate surface
374 Inner ring member
375 Outer ring member
380 Positioning mechanism
381 First positioning mechanism
382 Second positioning mechanism
383 Concave portion
384 Convex portion
385 Concave portion
386 Convex portion
401 Axial gap motor
430 Rotor
450 First magnet layer
451 First main magnetic pole magnet
452 First auxiliary pole magnet
460 Second magnet layer
461 Second main magnetic pole magnet
462 Second auxiliary pole magnet
470 Fastening mechanism
471 First end plate
472 Rotor structural member
473 Second end plate
474 Inner ring member
475 Outer ring member
480 Positioning mechanism
481 First positioning mechanism
482 Second positioning mechanism
483 Planar portion
484 Planar portion
485 Planar portion
486 Planar portion
AD Adhesive
BLT Bolt
Sa Space
Sv Space

What is claimed is:

1. An axial gap motor, comprising:
    a first stator and a second stator disposed to be opposite to each other in an axial direction; and
    a rotor arranged between the first stator and the second stator, and including
        a first magnet layer having a plurality of first main magnetic pole magnets and a plurality of first auxiliary pole magnets arranged at one side of each of the plurality of first main magnetic pole magnets, each of the plurality of first auxiliary pole magnets having a width smaller than that of each of the plurality of first main magnetic pole magnets in a circumferential direction of the first magnet layer, the plurality of first main magnetic pole magnets and the plurality of first auxiliary pole magnets being arranged in a Halbach array in the circumferential direction to increase a magnetic field strength toward the first stator, and
        a second magnet layer arranged on the first magnet layer in the axial direction and having a plurality of second main magnetic pole magnets and a plurality of second auxiliary pole magnets arranged at one side of each of the plurality of second main magnetic pole magnets, each of the plurality of second auxiliary pole magnets having a width smaller than that of each of the plurality of second main magnetic pole magnets in a circumferential direction of the second magnet layer, the plurality of second main magnetic pole magnets and the plurality of second auxiliary pole magnets being in a Halbach array in the circumferential direction to increase a magnetic field strength toward the second stator.

2. The axial gap motor according to claim 1, wherein the first magnet layer includes a first front surface and a first back surface and a magnetic field strength on the first front surface side is higher than that on the first back surface side,
    the second magnet layer includes a second front surface and a second back surface and a magnetic field strength on the second front surface side is higher than that on the second back surface side, and
    the first magnet layer and the second magnet layer are disposed such that the first back surface and the second back surface are opposite to each other.

3. The axial gap motor according to claim 1, wherein an orientation of a magnetic pole of each of the plurality of first main magnetic pole magnets and an orientation of a magnetic pole of each of the plurality of second main magnetic pole magnets are aligned.

4. The axial gap motor according to claim 1, wherein the rotor includes a fastening mechanism configured to fasten the first magnet layer and the second magnet layer.

5. The axial gap motor according to claim 4, wherein the rotor further includes a positioning mechanism configured to position the first magnet layer and the second magnet layer in the circumferential direction with respect to the fastening mechanism.

6. The axial gap motor according to claim 1, wherein three of the plurality of first auxiliary pole magnets are disposed in each space between two of the plurality of first main magnetic pole magnets and three of the plurality of second auxiliary pole magnets are disposed in each space between two of the plurality of second main magnetic pole magnets,
    when one first main magnetic pole magnet in the plurality of first main magnetic pole magnets and three first auxiliary pole magnets in the plurality of first auxiliary pole magnets, adjacent to each other in the circumferential direction are set as a first magnet group and a width of the first magnet group in the circumferential direction is set to 4, a width of the one first main magnetic pole magnet in the circumferential direction is 2.5 to 3.0 relative to the width of the first magnet group set as 4, and
    when one second main magnetic pole magnet in the plurality of second main magnetic pole magnets and three second auxiliary pole magnets in the plurality of second auxiliary pole magnets, adjacent to each other in the circumferential direction are set as a second magnet group and a width of the second magnet group in the circumferential direction is set to 4, a width of the one second main magnetic pole magnet in the circumferential direction is 2.5 to 3.0 relative to the width of the second magnet group set as 4.

7. The axial gap motor according to claim 1, wherein two of the plurality of first auxiliary pole magnets are disposed in each space between two of the plurality of first main magnetic pole magnets and two of the plurality of second auxiliary pole magnets are disposed in each space between two of the plurality of second main magnetic pole magnets,
    when one first main magnetic pole magnet in the plurality of first main magnetic pole magnets and two first auxiliary pole magnets in the plurality of first auxiliary pole magnets, adjacent to each other in the circumferential direction are set as a first magnet group and a width of the first magnet group in the circumferential direction is set to 3, a width of the one first main magnetic pole magnet in the circumferential direction is 1.6 to 2.2 relative to the width of the first magnet group set as 3, and
    when one second main magnetic pole magnet in the plurality of second main magnetic pole magnets and two second auxiliary pole magnets in the plurality of second auxiliary pole magnets, adjacent to each other in the circumferential direction are set as a second magnet group and a width of the second magnet group in the circumferential direction is set to 3, a width of the one second main magnetic pole magnet in the circumferential direction is 1.6 to 2.2 relative to the width of the second magnet group set as 3.

8. The axial gap motor according to claim 1, wherein one of the plurality of first auxiliary pole magnets is disposed in each space between two of the plurality of first main magnetic pole magnets and one of the plurality of second auxiliary pole magnets is disposed in each space between two of the plurality of second main magnetic pole magnets,
    when one first main magnetic pole magnet in the plurality of first main magnetic pole magnets and one first auxiliary pole magnet in the plurality of first auxiliary pole magnets, adjacent to each other in the circumferential direction are set as a first magnet group and a width of the first magnet group in the circumferential direction is set to 2, a width of the one first main magnetic pole magnet in the circumferential direction is 1.2 to 1.6 relative to the width of the first magnet group set as 2, and
    when one second main magnetic pole magnet in the plurality of second main magnetic pole magnets and one second auxiliary pole magnet in the plurality of second auxiliary pole magnets, adjacent to each other, are set as a second magnet group and a width of the second magnet group in the circumferential direction is set to 2, a width of the one second main magnetic pole magnet in the circumferential direction is 1.2 to 1.6 relative to the width of the second magnet group set as 2.

9. The axial gap motor according to claim 2, wherein an orientation of a magnetic pole of each of the plurality of first main magnetic pole magnets and an orientation of a magnetic pole of each of the plurality of second main magnetic pole magnets are aligned.

10. The axial gap motor according to claim 2, wherein the rotor includes a fastening mechanism configured to fasten the first magnet layer and the second magnet layer.

11. The axial gap motor according to claim 10, wherein the rotor further includes a positioning mechanism configured to position the first magnet layer and the second magnet layer in the circumferential direction with respect to the fastening mechanism.

12. The axial gap motor according to claim 2, wherein three of the plurality of first auxiliary pole magnets are disposed in each space between two of the plurality of first main magnetic pole magnets and three of the plurality of second auxiliary pole magnets are disposed in each space between two of the plurality of second main magnetic pole magnets,
when one first main magnetic pole magnet in the plurality of first main magnetic pole magnets and three first auxiliary pole magnets in the plurality of first auxiliary pole magnets, adjacent to each other in the circumferential direction are set as a first magnet group and a width of the first magnet group in the circumferential direction is set to 4, a width of the one first main magnetic pole magnets is 2.5 to 3.0 relative to the width of the first magnet group set as 4, and
when one second main magnetic pole magnet in the plurality of second main magnetic pole magnets and three second auxiliary pole magnets in the plurality of second auxiliary pole magnets, adjacent to each other in the circumferential direction are set as a second magnet group and a width of the second magnet group in the circumferential direction is set to 4, a width of the one second main magnetic pole magnet in the circumferential direction is 2.5 to 3.0 relative to the width of the second magnet group set as 4.

13. The axial gap motor according to claim 2, wherein two of the plurality of first auxiliary pole magnets are disposed in each space between two of the plurality of first main magnetic pole magnets and two of the plurality of second auxiliary pole magnets are disposed in each space between two of the plurality of second main magnetic pole magnets,
when one first main magnetic pole magnet in the plurality of first main magnetic pole and two first auxiliary pole magnets in the plurality of first auxiliary pole magnets, adjacent to each other in the circumferential direction, are set as a first magnet group and a width of the first magnet group in the circumferential direction is set to 3, a width of the one first main magnetic pole magnet in the circumferential direction is 1.6 to 2.2 relative to the width of the first magnet group set as 3, and
when one second main magnetic pole magnet in the plurality of second main magnetic pole magnets and two second auxiliary pole magnets in the plurality of second auxiliary pole magnets, adjacent to each other in the circumferential direction are set as a second magnet group and a width of the second magnet group in the circumferential direction is set to 3, a width of the one second main magnetic pole magnet in the circumferential direction is 1.6 to 2.2 relative to the width of the second magnet group set as 3.

14. The axial gap motor according to claim 2, wherein one of the plurality of first auxiliary pole magnets is disposed in each space between two of the plurality of first main magnetic pole magnets and one of the plurality of second auxiliary pole magnets is disposed in each space between two of the plurality of second main magnetic pole magnets,
when one first main magnetic pole magnet in the plurality of first main magnetic pole magnets and one first auxiliary pole magnet in the plurality of first auxiliary pole magnets, adjacent to each other in the circumferential direction are set as a first magnet group and a width of the first magnet group in the circumferential direction is set to 2, a width of the one first main magnetic pole magnet in the circumferential direction is 1.2 to 1.6 relative to the width of the first magnet group set as 2, and
when one second main magnetic pole magnet in the plurality of second main magnetic pole magnets and one second auxiliary pole magnet in the plurality of second auxiliary pole magnets, adjacent to each other in the circumferential direction are set as a second magnet group and a width of the second magnet group in the circumferential direction is set to 2, a width of the one second main magnetic pole magnet in the circumferential direction is 1.2 to 1.6 relative to the width of the second magnet group set as 2.

15. The axial gap motor according to claim 3, wherein the rotor includes a fastening mechanism configured to fasten the first magnet layer and the second magnet layer.

16. The axial gap motor according to claim 15, wherein the rotor further includes a positioning mechanism configured to position the first magnet layer and the second magnet layer in the circumferential direction with respect to the fastening mechanism.

17. The axial gap motor according to claim 3, wherein three of the plurality of first auxiliary pole magnets are disposed in each space between two of the plurality of first main magnetic pole magnets and three of the plurality of second auxiliary pole magnets are disposed in each space between two of the plurality of second main magnetic pole magnets,
when one first main magnetic pole magnet in the plurality of first main magnetic pole magnets and three first auxiliary pole magnets in the plurality of first auxiliary pole magnets, adjacent to each other in the circumferential direction are set as a first magnet group and a width of the first magnet group in the circumferential direction is set to 4, a width of the one first main magnetic pole magnet in the circumferential direction is 2.5 to 3.0 relative to the width of the first magnet group set as 4, and
when one second main magnetic pole magnet in the plurality of second main magnetic pole magnets and three second auxiliary pole magnets in the plurality of second auxiliary pole magnets, adjacent to each other in the circumferential direction are set as a second magnet group and a width of the second magnet group in the circumferential direction is set to 4, a width of the one second main magnetic pole magnet in the circumferential direction is 2.5 to 3.0 relative to the width of the second magnet group set as 4.

18. The axial gap motor according to claim 3, wherein two of the plurality of first auxiliary pole magnets are disposed in each space between two of the plurality of first main magnetic pole magnets and two of the plurality of second auxiliary pole magnets are disposed in each space between two of the plurality of second main magnetic pole magnets, when one first main magnetic pole magnet in the plurality of first main magnetic pole magnets and two first auxiliary pole magnets in the plurality of first auxiliary pole magnets, adjacent to each other in the circumferential direction are set as a first magnet group and a width of the first magnet group in the circumferential direction is set to 3, a width of the one first main magnetic pole magnet in the circumferential direction is 1.6 to 2.2 relative to the width of the first magnet group set as 3, and when one second main magnetic pole magnet in the plurality of second main magnetic pole magnets and two second auxiliary pole magnets in the plurality of second auxiliary pole magnets, adjacent to each other in the circumferential direction are set as a second magnet group and a width of the second magnet group in the circumferential direction is set to 3, a width of the one second main magnetic pole magnets in the circumferential direction is 1.6 to 2.2 relative to the width of the second magnet group set as 3.

19. The axial gap motor according to claim 3, wherein one of the plurality of first auxiliary pole magnets is disposed in each space between two of the plurality of first main magnetic pole magnets and one of the plurality of second auxiliary pole magnets is disposed in each space between two of the plurality of second main magnetic pole magnets, when one first main magnetic pole magnet in the plurality of first main magnetic pole magnets and one first auxiliary pole magnet in the plurality of first auxiliary pole magnets, adjacent to each other in the circumferential direction are set as a first magnet group and a width of the first magnet group in the circumferential direction is set to 2, a width of the one first main magnetic pole magnet in the circumferential direction is 1.2 to 1.6 relative to the width of the first magnet group set as 2, and when one second main magnetic pole magnet in the plurality of second main magnetic pole magnets and one second auxiliary pole magnet in the plurality of second auxiliary pole magnets, adjacent to each other in the circumferential direction are set as a second magnet group and a width of the second magnet group in the circumferential direction is set to 2, a width of the one second main magnetic pole magnet in the circumferential direction is 1.2 to 1.6 relative to the width of the second magnet group set as 2.

20. A method for manufacturing a rotor of an axial gap motor, comprising:

a fastening mechanism disposition step of disposing a first end plate and a first rotor structural member;

a first magnet layer-forming step of arranging a plurality of first main magnetic pole magnets and a plurality of first auxiliary pole magnets in a Halbach array and forming a first magnet layer to increase a magnetic field strength on a surface side facing the first end plate, the plurality of first auxiliary pole magnets being arranged at one side of each of the plurality of first main magnetic pole magnets, and each of the plurality of first auxiliary pole magnets having a width smaller than that of each of the plurality of first main magnetic pole magnets in a circumferential direction of the first magnet layer;

a second magnet layer-forming step of arranging a plurality of second main magnetic pole magnets and a plurality of second auxiliary pole magnets in a Halbach array and forming a second magnet layer to increase a magnetic field strength on a surface side opposite to the surface facing the first magnet layer, the plurality of second auxiliary pole magnets being arranged at one side of each of the plurality of second main magnetic pole magnets, and each of the plurality of second auxiliary pole magnets having a width smaller than that of each of the plurality of second main magnetic pole magnets in a circumferential direction of the second magnet layer; and a fastening step of disposing a second end plate and fastening the first magnet layer and the second magnet layer.

* * * * *